United States Patent
Sakakibara

(10) Patent No.: US 7,830,683 B2
(45) Date of Patent: Nov. 9, 2010

(54) CURRENT CONTROL TYPE CONVERTER

(75) Inventor: Kenichi Sakakibara, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 113 days.

(21) Appl. No.: 12/438,993

(22) PCT Filed: Aug. 27, 2007

(86) PCT No.: PCT/JP2007/066568
§ 371 (c)(1),
(2), (4) Date: Feb. 26, 2009

(87) PCT Pub. No.: WO2008/026547
PCT Pub. Date: Mar. 6, 2008

(65) Prior Publication Data
US 2010/0014327 A1 Jan. 21, 2010

(30) Foreign Application Priority Data
Aug. 28, 2006 (JP) .............................. 2006-230302

(51) Int. Cl.
*H02M 1/00* (2007.01)
*H02M 7/757* (2006.01)
(52) U.S. Cl. .......................................... 363/49; 363/81
(58) Field of Classification Search .................... 363/49, 363/125, 81, 84
See application file for complete search history.

(56) References Cited

U.S. PATENT DOCUMENTS
5,880,947 A    3/1999 Imanaka et al.
5,969,957 A  * 10/1999 Divan et al. .................... 363/36

FOREIGN PATENT DOCUMENTS
JP  08-214550 A    8/1996
JP  10-304669 A   11/1998
WO  WO-97/12437    4/1997

* cited by examiner

*Primary Examiner*—Shawn Riley
(74) *Attorney, Agent, or Firm*—Global IP Counselors

(57) ABSTRACT

A current control type converter has a converter section and a control section that includes three controllers. A first controller calculates and outputs an active current instruction value by proportional-plus-integral control to perform proportional integration of a deviation between the value of a DC voltage outputted from the converter section and a DC voltage instruction value. A second controller calculates and outputs an active voltage correction value by proportional-plus-integral control to perform proportional integration of a deviation between the active current instruction value from the first controller and the value of an active current inputted to the converter section. A third controller calculates and outputs a reactive voltage correction value by proportional-plus-integral control to perform proportional integration of a deviation between the value of a reactive current inputted to the converter section and a reactive current instruction value.

13 Claims, 16 Drawing Sheets

US 7,830,683 B2

CURRENT CONTROL TYPE CONVERTER

CROSS-REFERENCE TO RELATED APPLICATIONS

This U.S. National stage application claims priority under 35 U.S.C. §119(a) to Japanese Patent Application No. 2006-230302, filed Aug. 28, 2006, the entire contents of which are hereby incorporated herein by reference.

TECHNICAL FIELD

The present invention relates to current control type converters and, in particular, to a current control type converter that has a converter section to convert a three-phase AC voltage into a DC voltage.

BACKGROUND ART

Conventionally, there has been a current control type converter that has a converter control system using current control by the dq axis (refer to, for example, JP3192058).

The current control type converter controls the DC voltage constant by using a q-axis current as an active component, using a p-axis current as a reactive component and controlling the active component by an active current instruction value on the basis of the deviation of the voltage controller for the DC voltage that varies in correspondence with the load. On the other hand, with regard to the reactive component, operation such that a power factor is one is performed by making a reactive current instruction value zero.

In this case, PI controller is used for the active current control system and the reactive current control system, and for suppression of an overcurrent during a startup time, there are the control system shown in FIG. 10 in which the integrator of the q-axis current compensator is initially set, the control system shown in FIG. 11 in which the integrator of the q-axis current compensator and the integrator of the DC voltage compensator are both initially set, and the control system shown in FIG. 12 in which the DC voltage instruction value is initially set smaller than the detected value.

The PI controller 7 of a first current control type converter that has the control system shown in FIG. 10 is constructed of an integrator 18a, a limiter 19a, a proportional multiplier 20a and an adder-subtractor 21a. The PI controller 15a is constructed of an integrator 18b, a limiter 19b, a proportional multiplier 20b and an adder-subtractor 21b. The PI controller 15b is constructed of an integrator 18c, a limiter 19c, a proportional multiplier 20c and an adder-subtractor 21c. In FIG. 10, reference signs 14a, 14b, 17a, 17b denote adder-subtractors, and signs 16a, 16b denote gains.

In the current control type converter, an AC power is turned on in a state in which a PWM signal is stopped, and a smoothing capacitor connected to an output is initially charged up to a diode rectification voltage. Subsequently, the output of the integrator 18b of the PI controller 15a that outputs an active voltage correction value $\Delta V_q$ is consistently set to a negative value or a negative limit value by PI integrator output initial setting means 23 until a converter startup instruction 22 is outputted. By this operation, the active voltage correction value $\Delta V_q$ becomes a negative value since the initial value of the integrator 18b is smaller than the output of the proportional multiplier 20b even when an active current instruction value $I_q^*$ is positive. Accordingly, an active voltage instruction value $V_q^*$ becomes a value close to the maximum value, and a converter input voltage becomes comparatively large even in a diode rectification voltage of which the DC voltage is comparatively low during the converter startup time. As a result, a difference voltage between the power voltage and the converter input voltage becomes small, and no excessive power current flows. When the DC voltage rises and reaches the DC voltage instruction value in the steady state operation, the active voltage correction value $\Delta V_q$ and the output of the integrator 18b converge almost to zero.

As described above, in the first current control type converter that has the control system shown in FIG. 10, an excessive power current during the converter startup time is suppressed by beginning startup in a state in which the output of the integrator 18b for PI compensation is set to the negative value or the negative limiter before startup of the converter.

Moreover, a second current control type converter that has the control system shown in FIG. 11 differs from FIG. 10 in that the output of the integrator 18a of the PI controller 7 to output the active current instruction value $I_q^*$ is set to a negative value or a negative limit value in addition to the setting of the output of the integrator 18b of the PI controller 15a to output the active voltage correction value $\Delta V_q$ at the negative value or the negative limit value by the PI integrator output initial setting means 23 before startup of the converter. With this arrangement, a summation value of the initial value of the output of the integrator 18a and the output of the proportional multiplier 20a becomes the active current instruction value $I_q^*$, so that the active current instruction value $I_q^*$ can be made comparatively small. As a result, a deviation between the active current instruction value $I_q^*$ and the active current $I_q$ can be reduced, and the output of the proportional multiplier 20b becomes small. Accordingly, the output of the integrator 18b of the PI controller 15a that outputs the active voltage correction value $\Delta V_q$ is set to the negative limit value, and therefore, the active voltage instruction value $V_q^*$ becomes a value close to the maximum value.

As a result, in the second current control type converter that has the control system shown in FIG. 11, the converter input voltage becomes comparatively large as in FIG. 10, and the excessive power current during the converter startup time is suppressed.

Moreover, a third current control type converter that has the control system shown in FIG. 12 differs from FIG. 10 in that the outputs of the integrators 18a, 18b of the PI controller are set to a negative value or a negative limiter by providing DC voltage instruction setting means 24 and setting a smoothing capacitor DC voltage instruction value $V_{dc}^*$ smaller than a smoothing capacitor voltage detection value $V_{dc}$ before startup of the converter. Next, converter control is performed by raising the smoothing capacitor DC voltage instruction value $V_{dc}^*$ up to a converter control voltage instruction value together with a converter startup instruction in this state.

In the current control type converter that has the control system of any one of FIGS. 10 through 12 as described above, the integrator is brought into a saturated state by the initial value or the deviation during the startup time, and the output voltage instruction value is lowered with the time constant of the integrator. Therefore, a smooth shift from a rectifier mode to a PWM mode can be achieved.

Since the first through third current control type converters shown in FIGS. 10 through 12 have no steep change in the instruction value, the occurrence of an overcurrent can be suppressed. However, since the PI control is used for the voltage control system and the current control system of different time constants during the startup time, there is a problem that the integrators interfere with each other and an overcurrent occurs due to the overshoot of the current instruction value.

Simulations were conducted in the current control type converters of the constructions shown in FIGS. 10 through 12. In this case, the constants of the main circuit and the control system were set as follows in FIGS. 10 through 12.

Main circuit constants:
Reactor inductance L=3.5 mH;
Reactor resistance r=0.1 Ω;
Smoothing capacitor capacitance C=1000 μF;
DC no-load state
Power voltages:
Three-phase 400 VAC;
Control voltage:
700 VDC;
Voltage control system constants:
$K_p$=0.1;
$K_i$=2;
Limiter (±50);
Current control system constants:
$K_p$=3.5;
$K_i$=100;
Limiter (±100)

In this case, although only the control system that gives the voltage instruction value to the converter is shown, the converter is controlled so that the relation of the following Equation (1) holds on the basis of dq-axis voltages $V_d$, $V_q$ obtained by the control system.

$$V_i = \sqrt{V_d^2 + V_q^2} \quad (1)$$

$$K_s = \sqrt{2}\,\frac{V_i}{V_{dc}}$$

$$\phi = \tan^{-1}\left(\frac{V_d}{V_q}\right)$$

In this case, since the main circuit of the converter operates as a step-down converter for the DC voltage, the maximum value of a voltage control ratio Ks becomes one, and the circuit operates equivalent to the rectifier mode in the case of the maximum value.

The integral term of the current control system is set negative in FIG. 10, the integral term of the voltage control system is set negative in FIG. 11, and the deviation of the voltage control system is set negative in FIG. 12. Therefore, the active voltage correction value $\Delta V_q$ is added to a power voltage instruction value $V_r^*$, and the voltage instruction value $V_q$ is set large. Therefore, the voltage control ratio exceeds one according to Equation (1) but limited by the limiter of the maximum value.

FIG. 13 shows a simulation during the startup time conducted for the first current control type converter of the construction of FIG. 10. As shown in FIG. 13, the current control system integrator is initially set at −100 V in this case. Therefore, the power voltage instruction value $V_r^*$=400 V is added, and the initial value of the q-axis voltage instruction value $V_q$ is 500 V. In this case, the current instruction value rises as the PI controller integration value increases since the deviation of the DC voltage control system is positive. Therefore, the deviation of the current control system also becomes positive, and the q-axis voltage instruction value $V_q$ decreases since the PI controller integration value charged negative increases.

Since the converter is in the rectifier mode during the above operation, the DC voltage is charged to about 570 V that is the power crest value. However, since the q-axis voltage instruction value $V_q$ is not lower than 400 V, $K_s$ keeps an upper limit of one as expressed by Equation (1). Therefore, the converter does not perform PWM operation unless the q-axis voltage instruction value $V_q$ falls below 400 V. Therefore, the normal operation such that the control value is changed by the deviation does not function, and the operation is kept to verify the saturated integration value. This state is generally called a reset windup.

A reset windup such that a deviation is accumulated in the integrator of the DC voltage control system also occurs during the above operation. However, since the reset state is removed when $V_q$ falls below 400 V and the converter control is restored, overshoot occurs in the DC voltage while the current instruction value returns to zero.

FIG. 14, which is a simulation result of the second current control type converter shown in FIG. 11, shows both the voltage control system and the current control system initially set. The initial setting value of the voltage control system decreases from the deviation, and the operation after the current instruction value becomes positive is similar to that in the case of FIG. 13 that is the simulation result of the first current control type converter shown in FIG. 10.

Moreover, FIG. 15, which is a simulation result of the third current control type converter shown in FIG. 12, shows the deviation made negative by the voltage instruction value, where an initial value similar to that of FIG. 14 that is the simulation result of the current control type converter shown in FIG. 11 is set by the deviation. FIG. 16 is a simulation result of the current control type converter shown in FIG. 12 where the DC voltage instruction value is gradually increased from the initial value.

As described above, since the rectifier operates as a limiter in the conventional system, a reset windup state is compulsorily established by initially setting the integrator of the current control system, thereby easing a steep change in the instruction value by the integration time constant until removal. However, since errors are similarly accumulated by the reset windup in the voltage control system until the reset windup state of the current control system is removed, the overshoot of the DC voltage occurs at the instance of removal.

SUMMARY OF INVENTION

Technical Problem

It is an object of the present invention to provide a current control type converter capable of preventing the overshoot of the DC voltage during the startup time.

Solution to Problem

In order to achieve the object, a current control type converter according to the present invention comprises:

a converter section that converts a three-phase AC voltage into a DC voltage; and a control section that controls the converter section, wherein the control section comprises:

a voltage controller that calculates and outputs an active current instruction value by proportional-plus-integral control to perform proportional integration of a deviation between a value of a DC voltage outputted from the converter section and a DC voltage instruction value;

an active current controller that calculates and outputs an active voltage correction value by proportional-plus-integral control to perform proportional integration of a deviation between the active current instruction value from the voltage controller and a value of an active current inputted to the converter section; and a reactive current controller that calculates and outputs a reactive voltage correction value by proportional-plus-integral control to perform proportional integration of a deviation between a reactive current instruction value and a value of a reactive current inputted to the converter section, and outputs a control signal for controlling the converter section on the basis of the active voltage correction value from the active current controller) and the reactive voltage correction value from the reactive current controller, making the active current instruction value outputted from the voltage controller zero or negative and operating the active current controller by proportional control in a period from the beginning to completion of startup of the converter section, or operating the voltage controller by proportional control and making the active voltage correction value outputted from the active current controller zero or negative in the period from the beginning to the completion of startup of the converter section.

According to the above construction, the voltage controller of the control section calculates and outputs the active current instruction value by the proportional-plus-integral control to perform proportional integration of the deviation between the value of the DC voltage outputted from the converter section and the DC voltage instruction value. Moreover, the active current controller of the control section calculates and outputs the active voltage correction value by the proportional-plus-integral control to perform proportional integration of the deviation between the active current instruction value from the voltage controller and the value of the active current inputted to the converter section. The reactive current controller of the control section calculates and outputs the reactive voltage correction value by the proportional-plus-integral control to perform proportional integration of the deviation between the reactive current instruction value and the value of the reactive current inputted to the converter section. Then, the control section outputs a control signal to the converter section on the basis of the active voltage correction value from the active current controller and the reactive voltage correction value from the reactive current controller. In this case, by making the reactive current instruction value zero, operation such that a power factor is one can be performed. When the converter section is started up, the control section makes the active current instruction value outputted from the voltage controller zero or negative and operates the active current controller by the proportional control in the period from the beginning to the completion of startup of the converter section. By this operation, the active current controller does not enter the reset windup state during the startup time and the interference between the integral terms of the voltage controller of the voltage control system and the active current controller of the current control system is suppressed, and therefore, the overshoot of the DC voltage can be prevented. With this arrangement, highly reliable control can be performed, and the device withstand voltage can be reduced.

Otherwise, when the converter section is started up, the control section operates the voltage controller by the proportional control and makes the active voltage correction value outputted from the active current controller zero or negative in the period from the beginning to the completion of startup of the converter section. By this operation, the voltage controller does not enter the reset windup state during the startup time and the interference between the integral terms of the voltage controller of the voltage control system and the active current controller of the current control system is suppressed, and therefore, the overshoot of the DC voltage can be prevented. With this arrangement, highly reliable control can be performed, and the device withstand voltage can be reduced.

In one embodiment of the current control type converter, the current control type converter making the active current instruction value outputted from the voltage controller zero or negative and operating the active current controller by proportional control in the period from the beginning to the completion of startup of the converter section, wherein the control section comprises:

an initial setting section that sets an initial value of the voltage controller at the beginning of startup of the converter section;

a startup completion signal outputting section that outputs a startup completion signal representing the completion of startup of the converter section; and a control switchover section that switches the operation of the active current controller from proportional-plus-integral control to proportional control at the beginning of startup of the converter section and thereafter switches the operation of the active current controller from the proportional control to the proportional-plus-integral control when the startup completion signal outputting section outputs the startup completion signal.

According to the above embodiment, at the beginning of startup of the converter section, a steep change in the active current instruction value due to the integration time constant is eased by setting the initial value of the voltage controller by the initial setting section, and the operation of the active current controller is switched from the proportional-plus-integral control to the proportional control by the control switchover section. Moreover, when the startup completion signal outputting section outputs the startup completion signal, the operation of the active current controller is returned from the proportional control to the proportional-plus-integral control by the control switchover section. Thus, the active current instruction value is given by the time constant of the integral term of the voltage controller of the voltage control system during the startup time of the converter section, and therefore, stable startup without any overshoot of the DC voltage can be performed.

In one embodiment of the current control type converter, the current control type converter making the active current instruction value outputted from the voltage controller zero or negative and operating the active current controller by proportional control in the period from the beginning to the completion of startup of the converter section, wherein the control section comprises:

a DC voltage instructing section that makes the DC voltage instruction value a negative initial value at the beginning of startup of the converter section and then makes the DC voltage instruction value a positive predetermined value after a lapse of a predetermined time;

a startup completion signal outputting section that outputs a startup completion signal representing the completion of startup of the converter section; and a control switchover section that switches the operation of the active current controller from proportional-plus-integral control to proportional control at the beginning of startup of the converter section and thereafter switches the operation of the active current controller from the proportional control to the proportional-plus-integral control when the startup completion signal outputting section outputs the startup completion signal.

According to the above embodiment, the DC voltage instruction value is made the negative initial value by the DC voltage instructing section at the beginning of startup of the converter section and then the DC voltage instruction value is made the positive predetermined value after a lapse of the predetermined time, and the operation of the active current controller is returned from the proportional-plus-integral control to the proportional control by the control switchover section. When the startup completion signal outputting section outputs the startup completion signal, the operation of the active current controller is returned from the proportional control to the proportional-plus-integral control by the control switchover section. Thus, by making the DC voltage instruction value the negative initial value at the beginning of startup, the deviation between the value of the DC voltage outputted from the converter section and the DC voltage instruction value is made negative, and stable startup without any overshoot of the DC voltage can be performed.

In one embodiment of the current control type converter,
the current control type converter making the active current instruction value outputted from the voltage controller zero or negative and operating the active current controller by proportional control in the period from the beginning to the completion of startup of the converter section, wherein
the control section comprises:
a DC voltage instructing section that makes the DC voltage instruction value a negative initial value at the beginning of startup of the converter section and thereafter changes the initial value to a positive predetermined value in a gradually changing manner;
a startup completion signal outputting section that outputs a startup completion signal representing the completion of startup of the converter section; and
a control switchover section that switches the operation of the active current controller from proportional-plus-integral control to proportional control at the beginning of startup of the converter section and thereafter switches the operation of the active current controller from the proportional control to the proportional-plus-integral control when the startup completion signal outputting section outputs the startup completion signal.

According to the above embodiment, the DC voltage instruction value is made the negative initial value by the DC voltage instructing section at the beginning of startup of the converter section and thereafter gradually changed from the initial value to the positive predetermined value. Moreover, the operation of the active current controller is switched from the proportional-plus-integral control to the proportional control by the control switchover section at the beginning of startup of the converter section. When the startup completion signal outputting section outputs the startup completion signal, the operation of the active current controller is returned from the proportional control to the proportional-plus-integral control by the control switchover section. Thus, by making the DC voltage instruction value the negative initial value at the beginning of startup and thereafter raising the DC voltage instruction value by an arbitrary time function, the overshoot of the DC voltage does not occur, and control of a voltage rise rate in correspondence with the load becomes possible.

In one embodiment of the current control type converter,
the current control type converter operating the voltage controller by proportional control and making the active voltage correction value outputted from the active current controller zero or negative in the period from the beginning to the completion of startup of the converter section, wherein
the control section comprises:
an initial setting section that sets an initial value of the active current controller at the beginning of startup of the converter section;
a startup completion signal outputting section that outputs a startup completion signal representing the completion of startup of the converter section; and
a control switchover section that switches the operation of the voltage controller from proportional-plus-integral control to proportional control at the beginning of startup of the converter section and thereafter switches the operation of the voltage controller from the proportional control to the proportional-plus-integral control when the startup completion signal outputting section outputs the startup completion signal.

According to the above embodiment, the initial value of the active current controller is set by the initial setting section at the beginning of startup of the converter section to ease the steep change in the active voltage correction value due to the integration time constant, and the operation of the voltage controller is switched from the proportional-plus-integral control to the proportional control by the control switchover section. Moreover, when the startup completion signal outputting section outputs the startup completion signal, the operation of the voltage controller is returned from the proportional control to the proportional-plus-integral control by the control switchover section. Thus, errors are not accumulated in the integral term of the voltage controller of the voltage control system during the startup time of the converter section, and therefore, stable startup without any overshoot of the DC voltage can be performed.

In one embodiment of the current control type converter,
the startup completion signal outputting section of the control section outputs the startup completion signal on the basis of a deviation between the value of the DC voltage outputted from the converter section and the DC voltage instruction value.

According to the above embodiment, the startup completion signal outputting section outputs the startup completion signal on the basis of the deviation between the value of the DC voltage outputted from the converter section and the DC voltage instruction value. Therefore, by assuming that startup is completed when, for example, the deviation between the DC voltage value and the DC voltage instruction value becomes smaller than a predetermined value, the completion of startup can accurately be detected.

In one embodiment of the current control type converter,
the startup completion signal outputting section of the control section outputs the startup completion signal when a predetermined startup time has elapsed from the beginning of startup of the converter section.

According to the above embodiment, the startup completion signal outputting section outputs the startup completion signal on the assumption that startup is completed when the prescribed startup time has elapsed from the beginning of startup of the converter section. Therefore, the startup completion signal can be obtained with a simple construction.

As is apparent from the above, according to the current control type converter of the first aspect of the invention, the overshoot of the DC voltage can be prevented during the startup time, and highly reliable control and a reduction in the device withstand voltage can be achieved.

Moreover, according to the current control type converter of one embodiment, in the current control type converter in which the active current instruction value outputted from the voltage controller is made zero or negative and the active current controller is operated by the proportional control in the period from the beginning the completion of startup of the converter section, by setting the initial value of the voltage controller by the initial setting section and switching the operation of the active current controller from the proportional-plus-integral control to the proportional integration by the control switchover section at the beginning of startup of the converter section, and thereafter by switching the operation of the active current controller from the proportional control to the proportional-plus-integral control by the control switchover section when the startup completion signal outputting section outputs the startup completion signal, the active current instruction value is given by the time constant of the integral term of the voltage controller of the voltage control system. Therefore, stable startup without any overshoot of the DC voltage can be performed.

Moreover, according to the current control type converter of one embodiment, in the current control type converter in which the active current instruction value outputted from the voltage controller is made zero or negative and the active current controller is operated by the proportional control in the period from the beginning the completion of startup of the converter section, by making the DC voltage instruction value the negative initial value by the DC voltage instructing section at the beginning of startup of the converter section, making the DC voltage instruction value the positive predetermined value after a lapse of the predetermined time, and switching the operation of the active current controller from the proportional-plus-integral control to the proportional control by the control switchover section, and thereafter by switching the operation of the active current controller from the proportional control to the proportional-plus-integral control by the control switchover section when the startup completion signal outputting section outputs the startup completion signal, the deviation between the value of the DC voltage outputted from the control section and the DC voltage instruction value is made negative. Since the voltage controller does not enter the reset windup state, stable startup without any overshoot of the DC voltage can be performed.

Moreover, according to the current control type converter of one embodiment, in the current control type converter in which the active current instruction value outputted from the voltage controller is made zero or negative and the active current controller is operated by the proportional control in the period from the beginning the completion of startup of the converter section, by making the DC voltage instruction value the negative initial value by the DC voltage instructing section at the beginning of startup of the converter section, thereafter gradually changing the initial value to the positive predetermined value, switching the operation of the active current controller from the proportional-plus-integral control to the proportional control by the control switchover section at the beginning of startup of the converter section, and thereafter by switching the operation of the active current controller from the proportional control to the proportional-plus-integral control by the control switchover section when the startup completion signal outputting section outputs the startup completion signal, the DC voltage instruction value is made the negative initial value at the beginning of startup and then the DC voltage instruction value is raised by an arbitrary time function. Therefore, the overshoot of the DC voltage does not occur, and control of the voltage rise rate in correspondence with the load becomes possible.

Moreover, according to the current control type converter of one embodiment, in the current control type converter in which the voltage controller is operated by the proportional control in the period from the beginning the completion of startup of the converter section and the active voltage correction value outputted from the active current controller is made zero or negative, by setting the initial value of the active current controller by the initial setting section at the beginning of startup of the converter section, switching the operation of the voltage controller from the proportional-plus-integral control to the proportional control by the control switchover section, and thereafter by switching the operation of the voltage controller from the proportional control to the proportional-plus-integral control by the control switchover section when the startup completion signal outputting section outputs the startup completion signal, errors are not accumulated in the integral term of the voltage controller of the voltage control system. Therefore, stable startup without any overshoot of the DC voltage can be performed.

Moreover, according to the current control type converter of one embodiment, the startup completion signal outputting section outputs the startup completion signal on the basis of the deviation between the value of the DC voltage outputted from the converter section and the DC voltage instruction value. Thereby, the completion of startup can accurately be detected.

Moreover, according to the current control type converter of one embodiment, the startup completion signal outputting section outputs the startup completion signal on the assumption that startup is completed when the prescribed startup time has elapsed from the beginning of startup of the converter section. Thereby, the startup completion signal can be obtained with a simple construction.

DETAILED DESCRIPTION OF THE PREFERRED EMBODIMENTS

Figure 1:
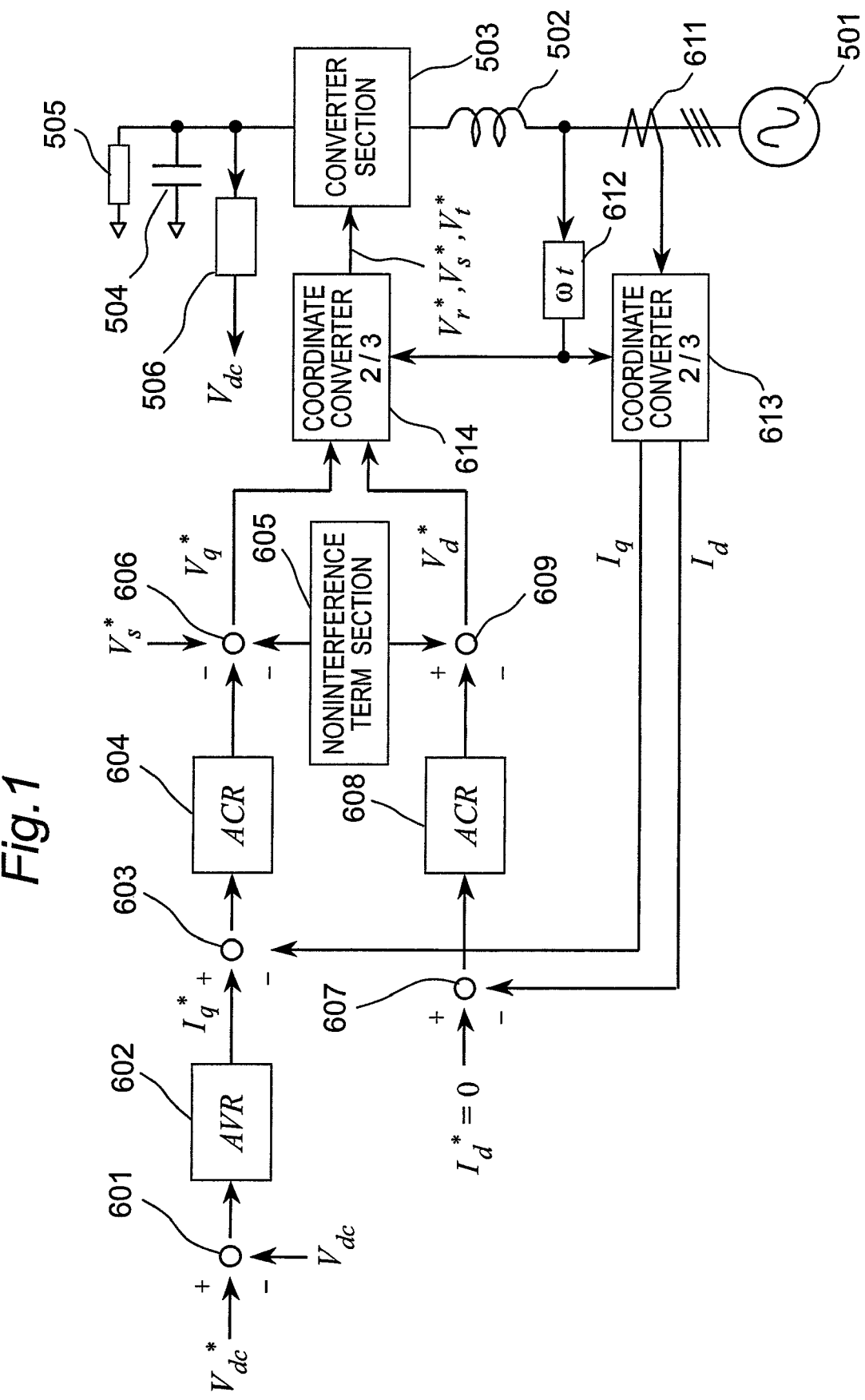
FIG. 1 is a diagram showing the basic configuration of the current control type converter of the invention.

The current control type converter of the invention will be described in detail below by the embodiments shown in the drawings.

FIG. 1 shows the basic configuration of the current control type converter of the invention. As shown in FIG. 1, the current control type converter includes a reactor 502 of which one terminal is connected to a three-phase AC voltage from a three-phase AC power source 501, a pulse width modulation system converter section 503 of which the input terminal is connected to the other terminal of the reactor 502 and which converts the three-phase AC voltage into a DC voltage, a smoothing capacitor 504 connected between the output terminal of the converter section 503 and the ground, a load 505 connected between the output terminal of the converter section 503 and the ground, and a voltage detector 506 that detects the value $V_{dc}$ of the DC voltage outputted from the converter section 503. The reactor 502 is constructed of three reactors provided for each phase between the three-phase AC power source 501 and the converter section 503.

The current control type converter further includes a current detector 611 that detects a three-phase input current flowing from the three-phase AC power source 501 to the converter section 503, a phase detector 612 that detects the phase of the three-phase AC voltage from the three-phase AC power source 501, a coordinate converter 613 that outputs an active current $I_q$ and a reactive current $I_d$, by subjecting the three-phase input current detected by the current detector 611 to three-phase/two-phase conversion on the basis of the phase of the three-phase AC voltage detected by the phase detector 612, an adder-subtractor 601 that subtracts the DC voltage value $V_{dc}$ detected by the voltage detector 506 from the DC voltage instruction value $V_{dc}*$ of a DC voltage instructing section (not shown), a voltage controller 602 that outputs the active current instruction value $I_q*$ on the basis of the output of the adder-subtractor 601, an adder-subtractor 603 that subtracts the active current $I_q$ from the active current instruction value $I_q*$ of the voltage controller 602, an active current controller 604 for performing control of an active current on the basis of the output of the adder-subtractor 603, a noninterference term section 605 that calculates a noninterference term, an adder-subtractor 606 that subtracts the output of the active current controller 604 and the noninterference term of the noninterference term section 605 from the power voltage value $V_s*$ and outputs a reactive voltage instruction value $V_q*$, an adder-subtractor 607 that subtracts the reactive current $I_d$ from the reactive current instruction value $I_d*=0$, a reactive current controller 608 for performing control of a reactive current on the basis of the output of the adder-subtractor 606, an adder-subtractor 609 that subtracts the output of the reactive current controller 608 from the interference term from the noninterference term section 605 and outputs an active voltage instruction value $V_d*$, and a coordinate converter 614 that outputs voltage instruction values $V_r*$, $V_s*$, $V_t*$ as control signals to the converter section 503 by subjecting the reactive voltage instruction value $V_q*$ and the active voltage instruction value $V_d*$ from the adder-subtractors 606, 609 to two-phase/three-phase conversion.

The adder-subtractor 601, the voltage controller 602, the adder-subtractor 603, the active current controller 604, the noninterference term section 605, the adder-subtractor 606, the adder-subtractor 607, the reactive current controller 608, the adder-subtractor 609, the phase detector 612, the coordinate converter 613 and the coordinate converter 614 constitute a control section.

Concrete constructions of the control system of the current control type converter are described in the following first through fourth embodiments.

First Embodiment

Figure 2:
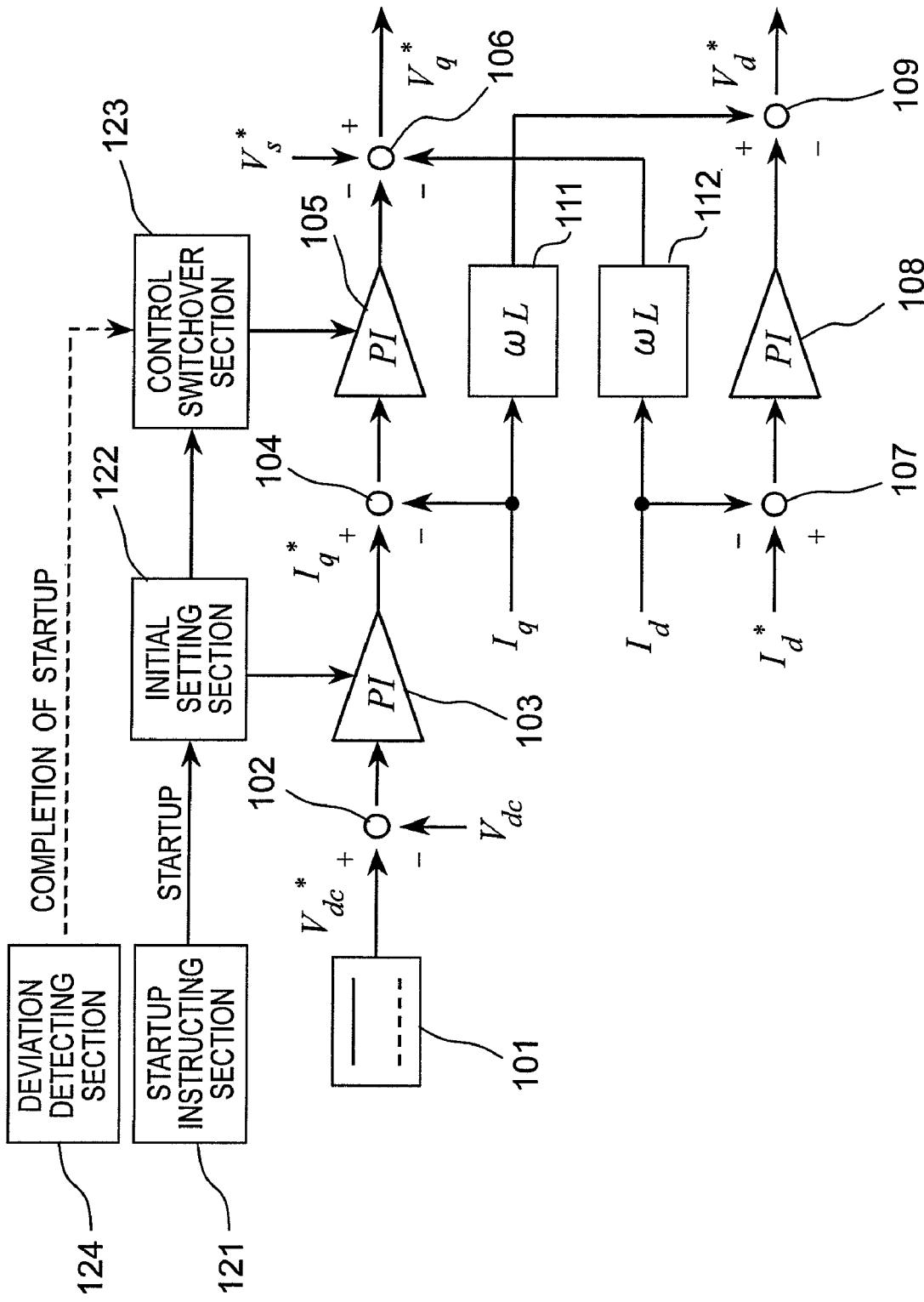
FIG. 2 is a diagram showing the construction of the essential part of the control system of the current control type converter according to a first embodiment of the invention.

FIG. 2 shows a block diagram of the essential part of the control system of a current control type converter according to the first embodiment of the invention.

As shown in FIG. 2, the current control type converter includes a DC voltage instructing section 101 that outputs a DC voltage instruction value $V_{dc}*$, an adder-subtractor 102 that subtracts a DC voltage value $V_{dc}$ from the DC voltage instruction value $V_{dc}*$ from the DC voltage instructing section 101, a PI controller 103 that serves as one example of the voltage controller for calculating and outputting an active current instruction value $I_q*$ by proportional-plus-integral control to perform proportional integration of a deviation between the DC voltage instruction value $V_{dc}*$ outputted from the adder-subtractor 102 and the DC voltage value $V_{dc}$, an adder-subtractor 104 that subtracts an active current $I_q$ from the active current instruction value $I_q*$ from the PI controller 103, a PI controller 105 that serves as one example of the active current controller for calculating and outputting an active voltage correction value by proportional-plus-integral control to perform proportional integration of a deviation between the active current instruction value $I_q*$ from the adder-subtractor 104 and the active current $I_q$, a multiplier 112 that multiplies the reactive current $I_d$ by an impedance $\omega L$ and outputs a q-axis interference term $I_d \omega L$, an adder-subtractor 106 that subtracts the active voltage correction value of the PI controller 105 and the q-axis interference term of the multiplier 112 from a power voltage value $V_s*$, an adder-subtractor 107 that subtracts the reactive current $I_d$ from the reactive current instruction value $I_d*$, a PI controller 108 that serves as one example of the reactive current controller for calculating and outputting a reactive voltage correction value by proportional-plus-integral control to perform proportional integration of a deviation between the reactive current instruction value $I_d*$ outputted from the adder-subtractor 107 and the reactive current $I_d$, a multiplier 111 that multiplies the active current $I_q$ by the impedance $\omega L$ and outputs a d-axis interference term $I_q \omega L$, and an adder-subtractor 109 that subtracts the reactive voltage correction value of the PI controller 108 from the d-axis interference term from the multiplier 111. In this case, $\omega$ is the angular frequency of the three-phase voltage from the three-phase voltage power source 501 (shown in FIG. 1), and L is the inductance of the reactor 502 (shown in FIG. 1).

The PI controller 103 corresponds to the voltage controller 602 of FIG. 1, the PI controller 105 corresponds to the voltage controller 604 of FIG. 1, and the PI controller 108 corresponds to the voltage controller 608 of FIG. 1. Moreover, the multipliers 111, 112 correspond to the noninterference term section 605 of FIG. 1.

The current control type converter further includes a startup instructing section 121 that outputs a startup signal, an initial setting section 122 that sets the initial value of the PI controller 103 on the basis of the startup signal from the startup instructing section 121, a control switchover section 123 that operates the PI controller 103 by proportional control excluding the integral term of the PI controller 103 on the basis of the startup signal from the initial setting section 122, and a deviation detecting section 124 that serves as one example of the startup completion signal outputting section for detecting a deviation between the DC voltage instruction value $V_{dc}*$ and the DC voltage value $V_{dc}$ and outputting a startup completion signal when the absolute value of the deviation becomes smaller than a predetermined value.

In the current control type converter of the above construction, the initial setting section 122 sets the initial value of the PI controller 103 when the startup signal is outputted from the startup instructing section 121. At the same time, the control switchover section 123 switches the operation of the PI controller 105 of the current control system from the PI control to the proportional control when the startup signal is outputted from the initial setting section 122.

When the DC voltage value $V_{dc}$ reaches the DC voltage instruction value $V_{dc}^*$ after startup, i.e., when the absolute value of the deviation between the DC voltage instruction value $V_{dc}^*$ and the DC voltage value $V_{dc}$ becomes smaller than the predetermined value, the deviation detecting section 124 outputs the startup completion signal. The control switchover section 123 switches the operation of the PI controller 105 of the current control system from the proportional control to the PI control on the basis of the startup completion signal from the deviation detecting section 124.

In the current control type converter of the above construction, errors are accumulated in the integral term of the voltage control system in a period until the reset windup state of the current control system is removed. Therefore, the integral term of the current control system is excluded during the startup time, so that no time for reset windup removal is generated.

Figure 3:
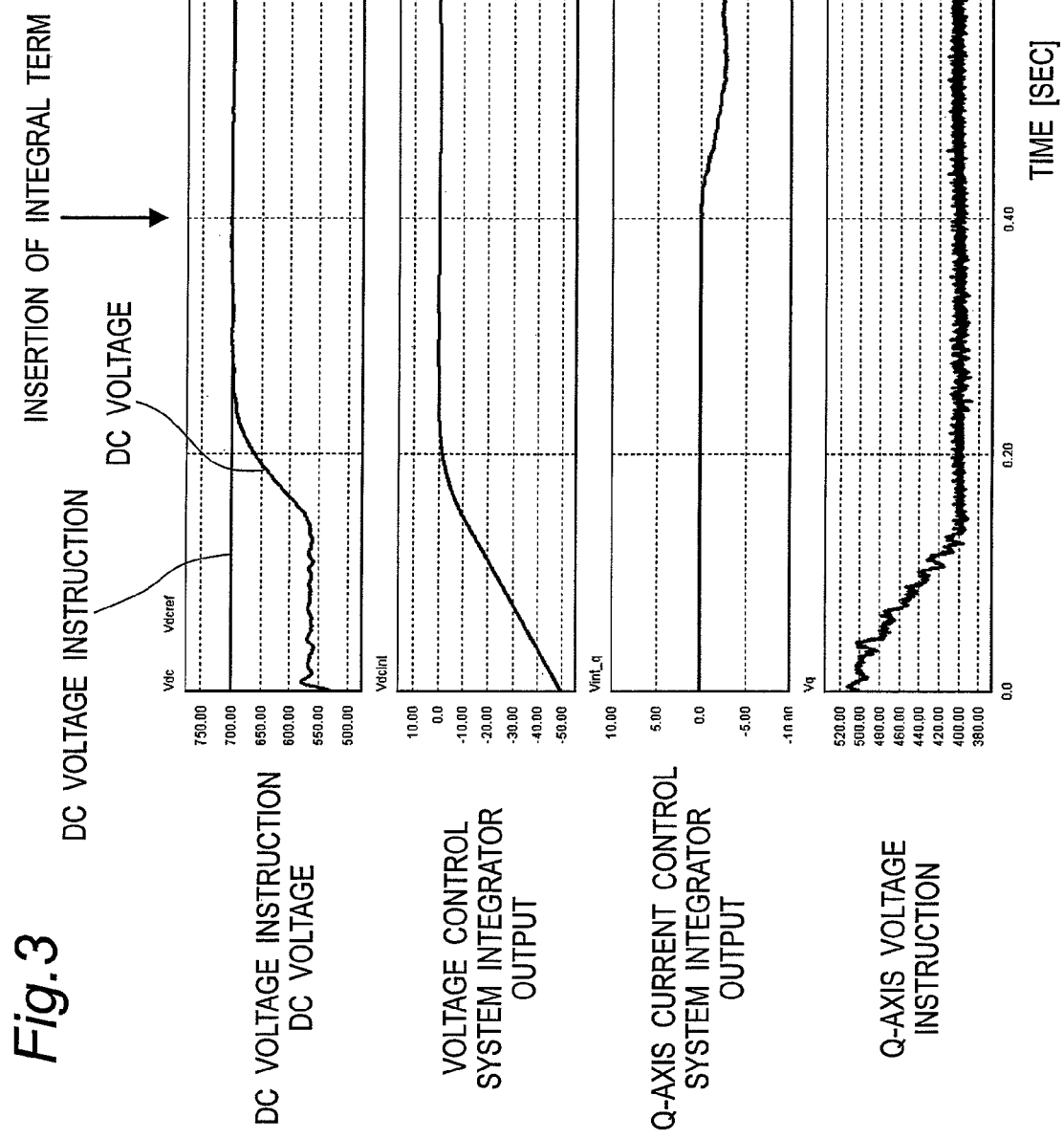
FIG. 3 is a graph showing the simulation results of the current control type converter.
Figure 10:
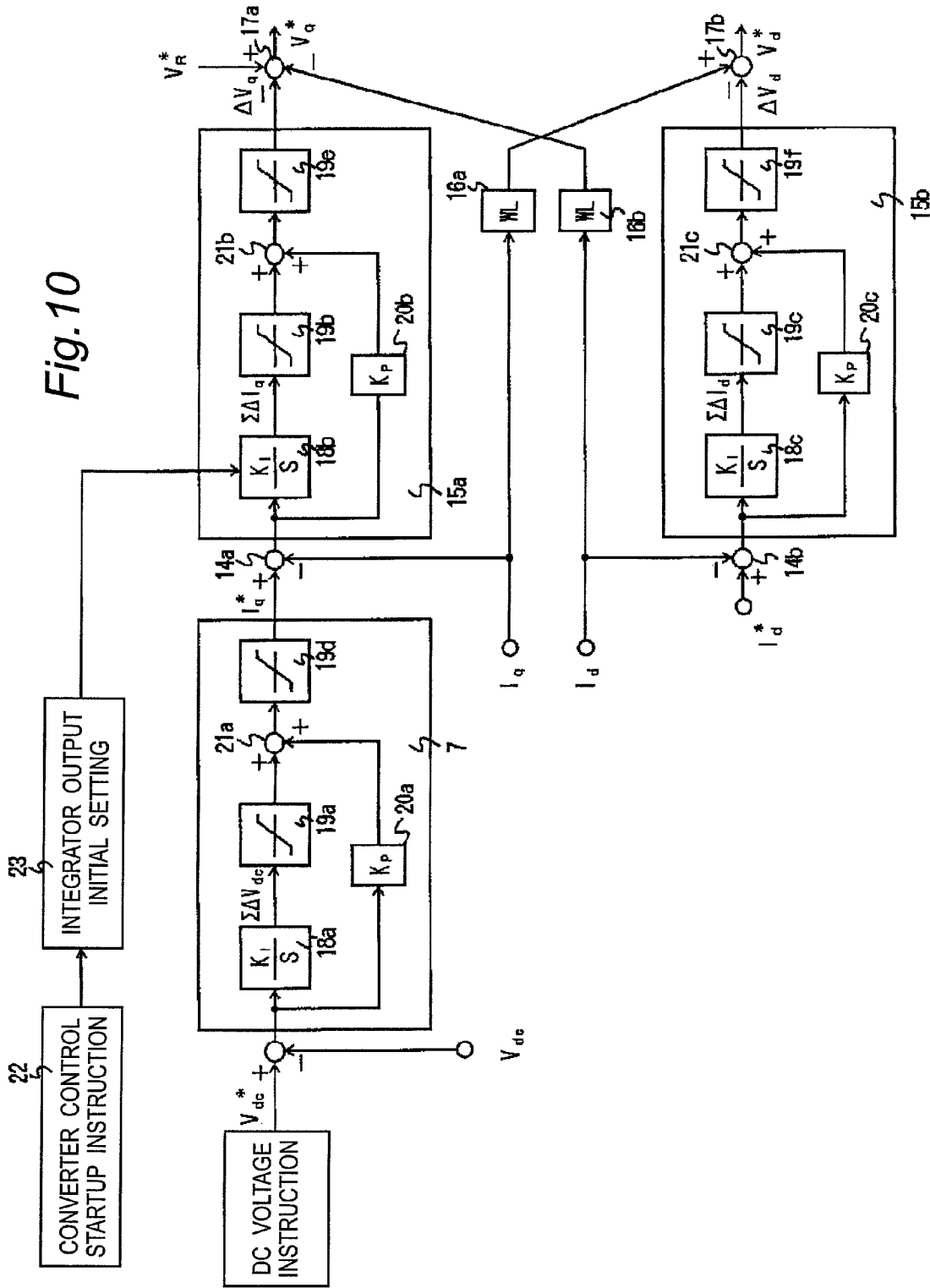
FIG. 10 is a diagram showing the essential part of the control system of a conventional first current control type converter.
Figure 11:
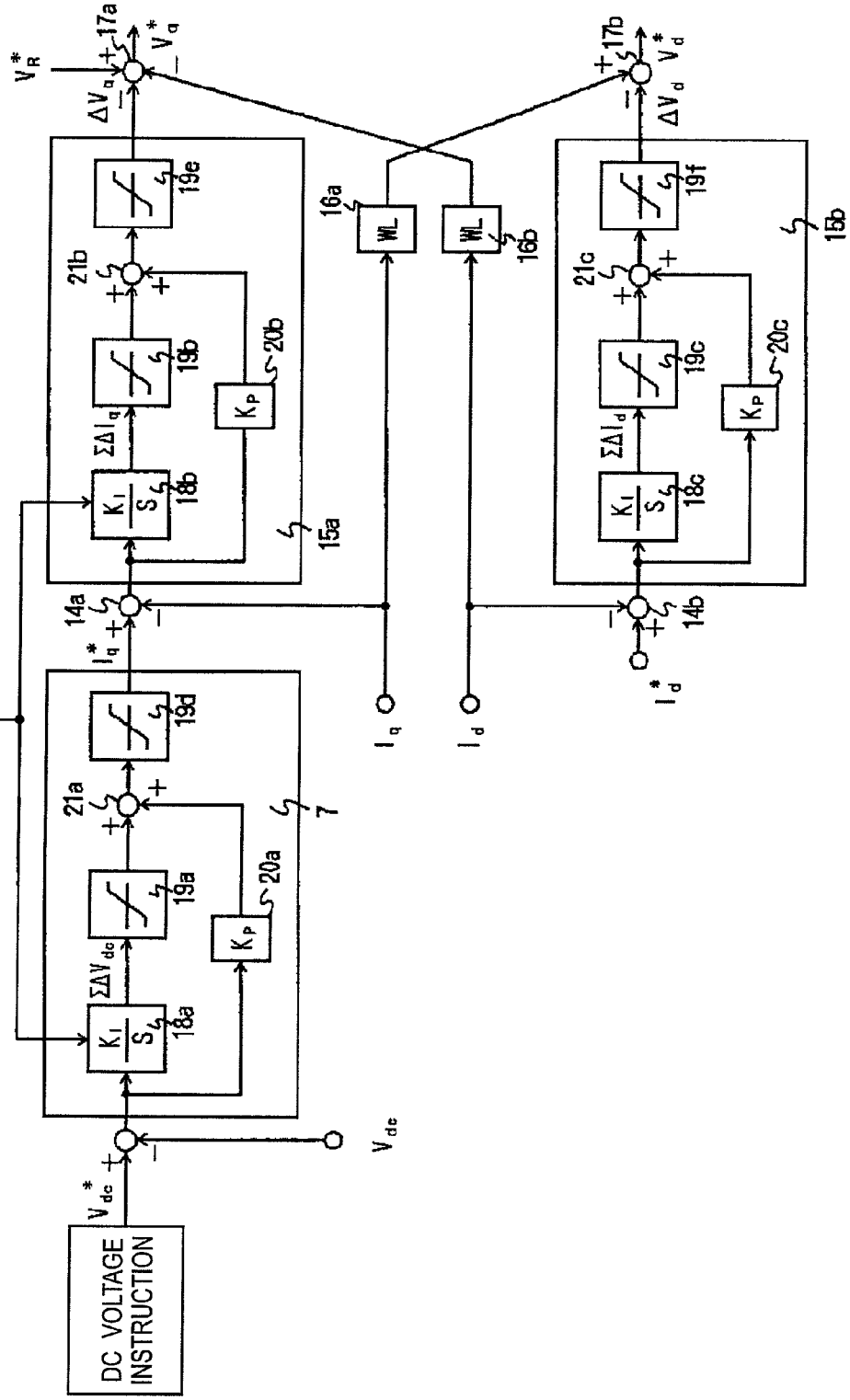
FIG. 11 is a diagram showing the essential part of the control system of a conventional second current control type converter.
Figure 12:
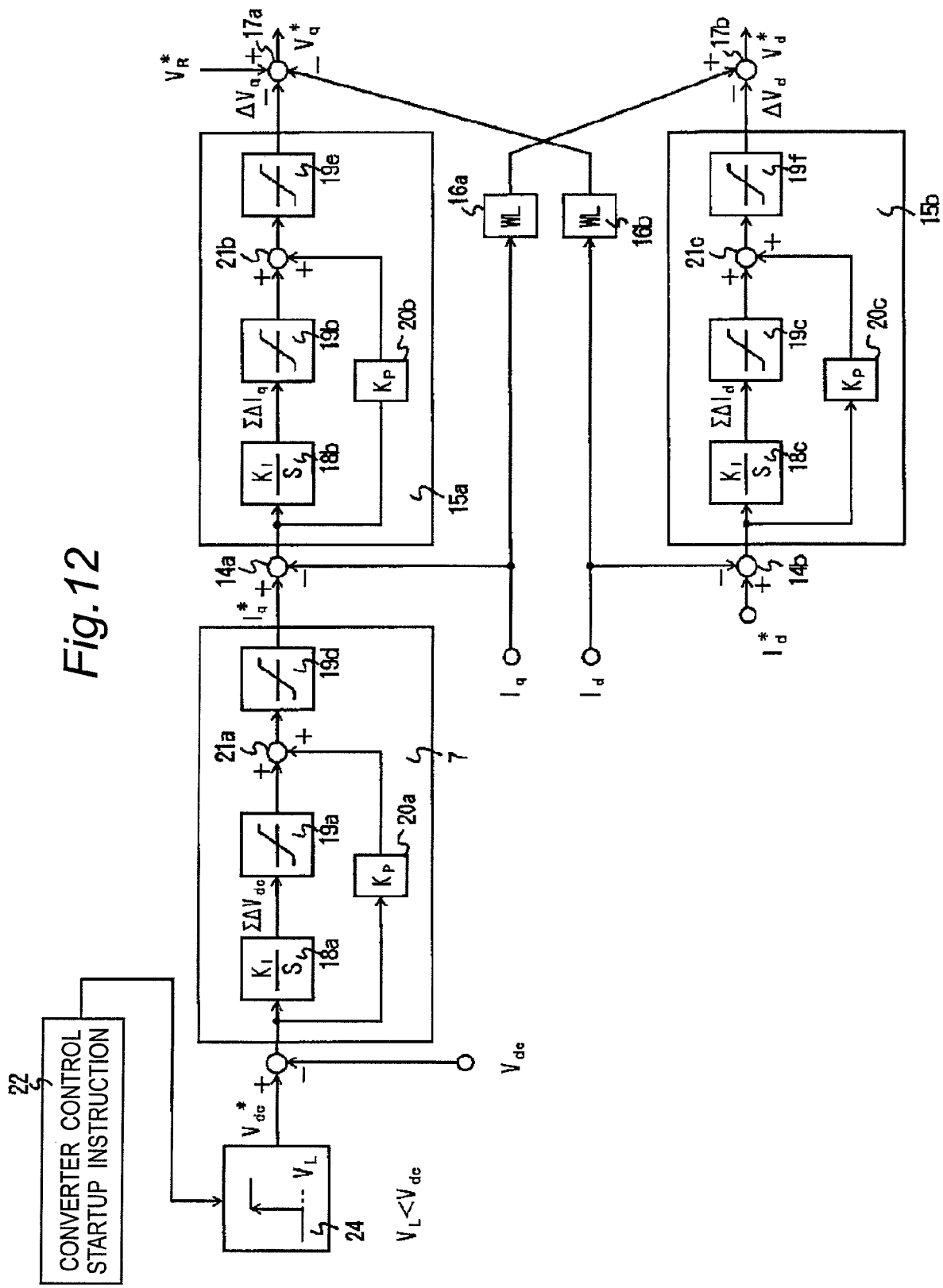
FIG. 12 is a diagram showing the essential part of the control system of a conventional third current control type converter.
Figure 13:
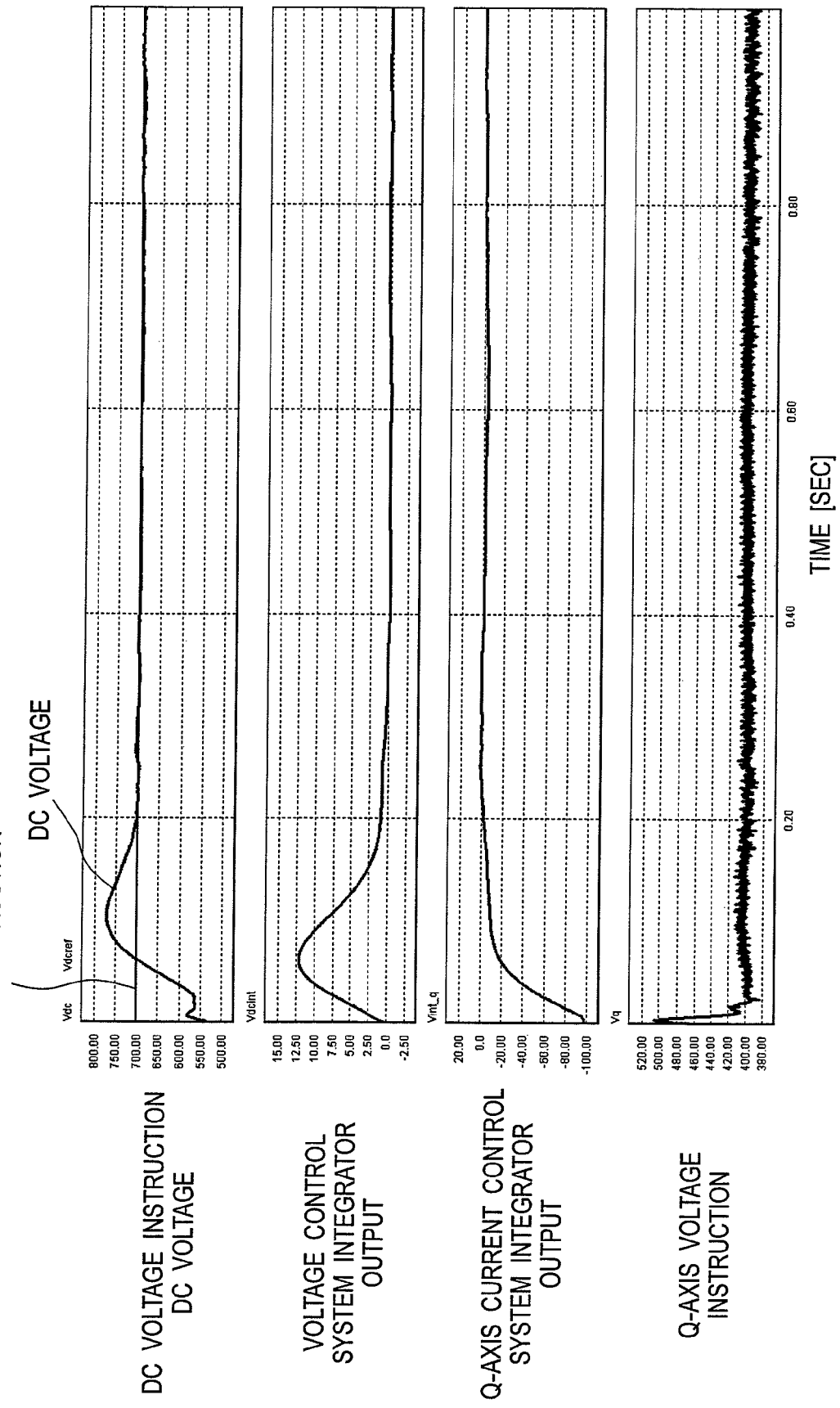
FIG. 13 shows the simulation results during the startup time of the current control type converter of the construction of FIG. 10.
Figure 14:
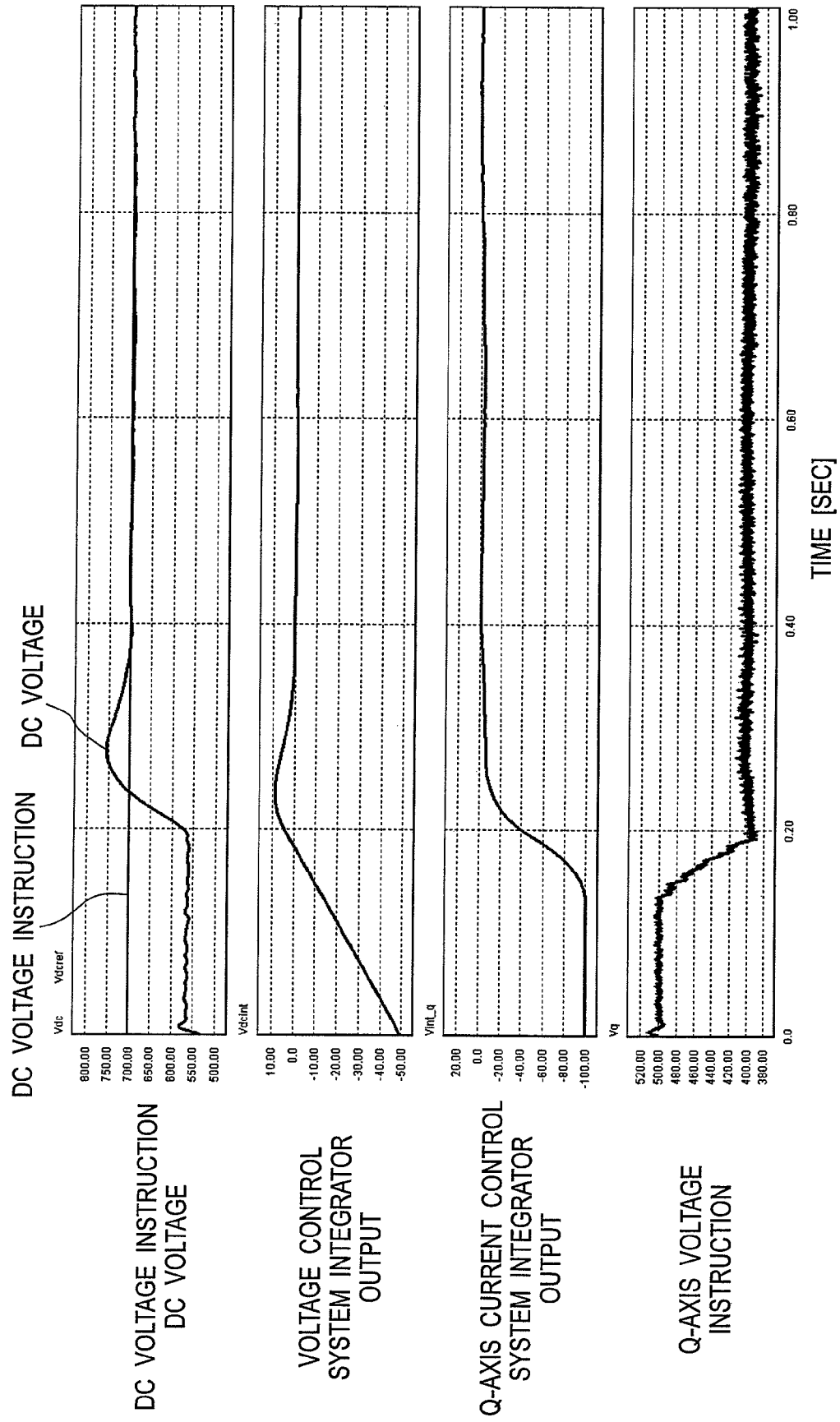
FIG. 14 shows the simulation results during the startup time of the current control type converter of the construction of FIG. 11.
Figure 15:
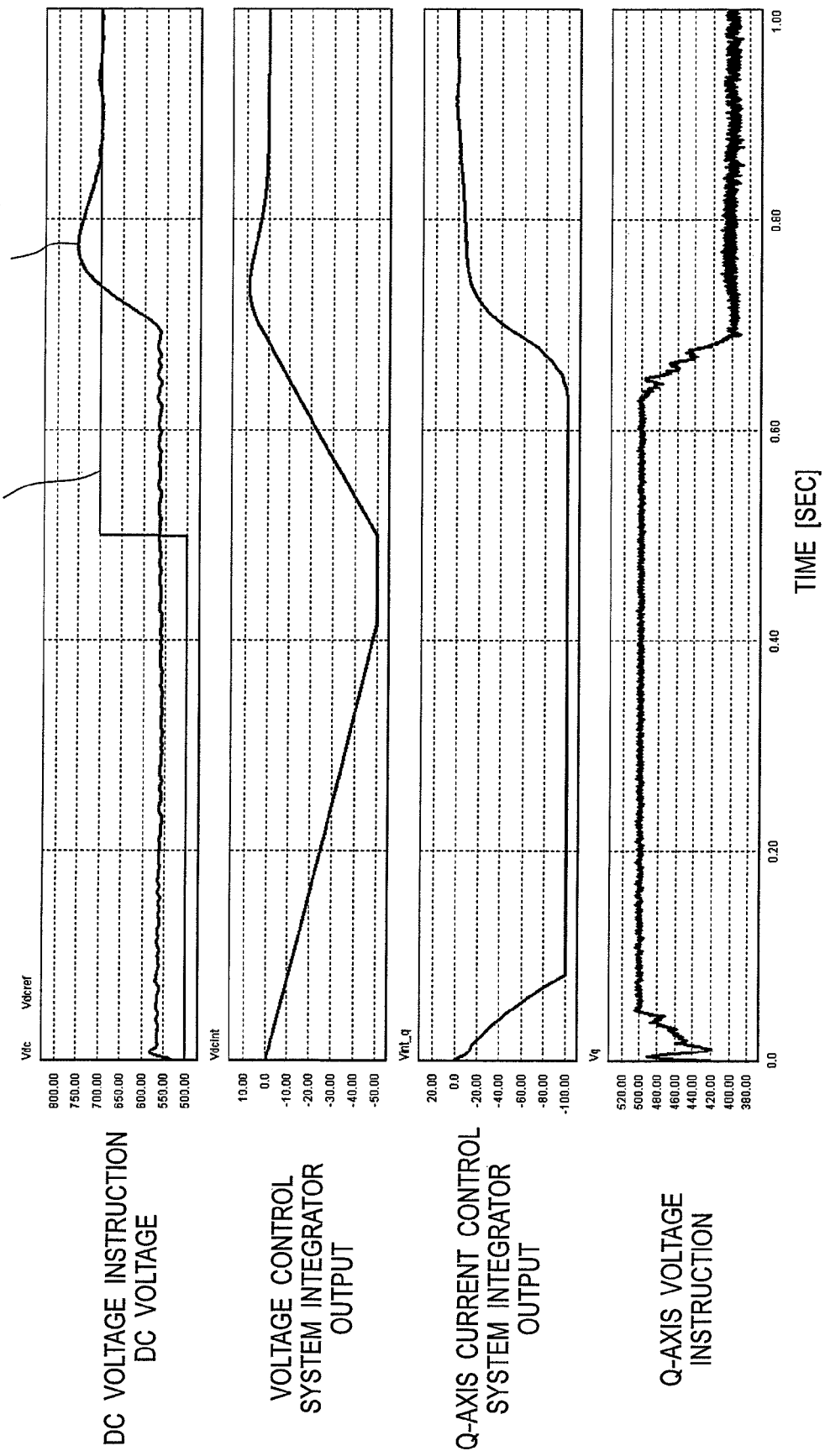
FIG. 15 shows the simulation results during the startup time of the current control type converter of the construction of FIG. 12.
Figure 16:
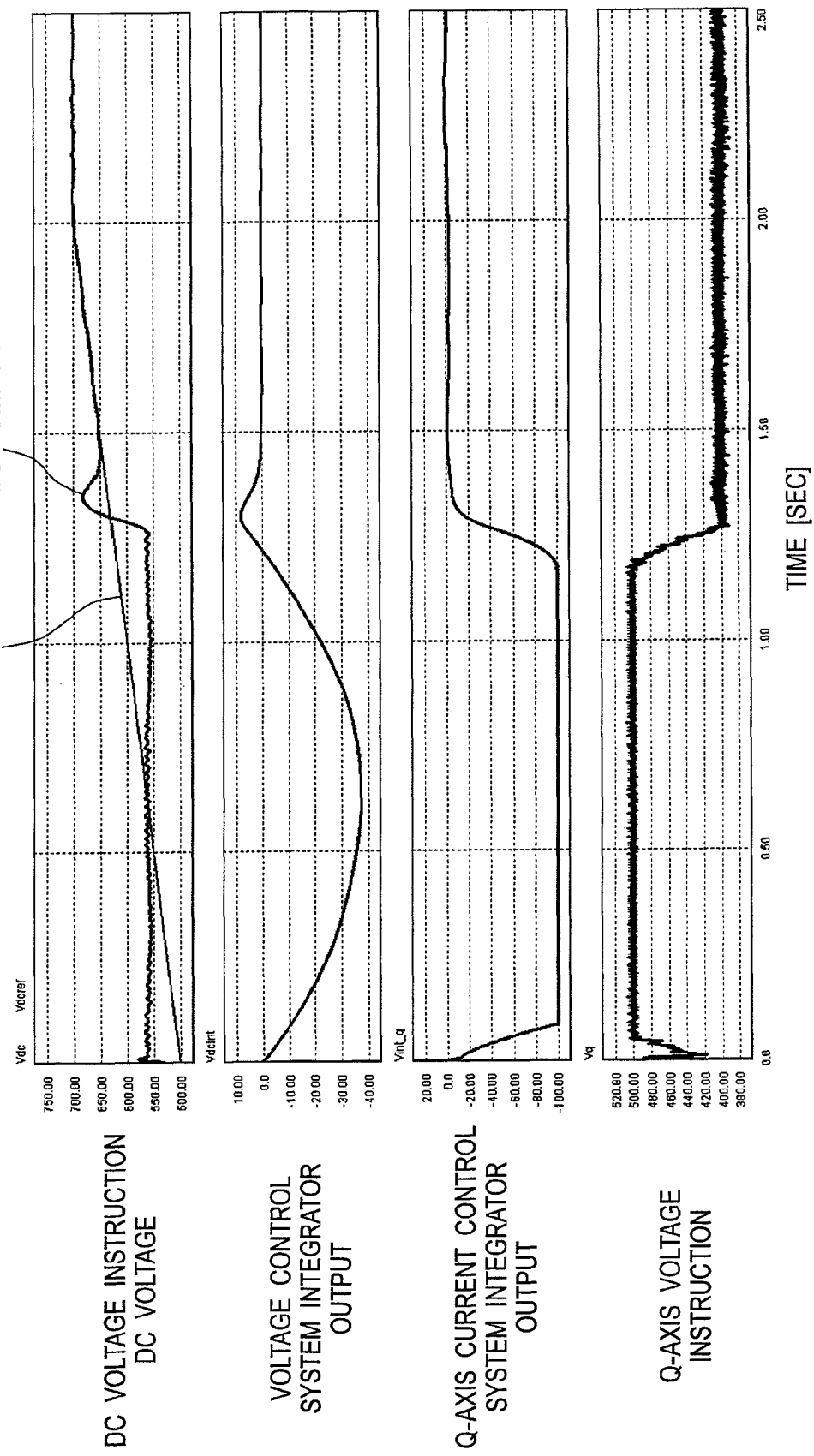
FIG. 16 is a graph showing the simulation results when a DC voltage instruction value is gradually increased from an initial value in the current control type converter shown in FIG. 12.

FIG. 3 shows the simulation results of the current control type converter that has the control system shown in FIG. 2. It is noted that the simulation conditions are the same as the simulation conditions of the current control type converters of FIGS. 10 through 12. In FIG. 3, the horizontal axis represents time [sec], and the vertical axis represents a DC voltage instruction [V], a DC voltage [V], a voltage control system integrator output, a q-axis current control system integrator output and a q-axis voltage instruction [V] from the upper side.

In the current control type converter of the first embodiment, the integral term is excluded by controlling the PI controller 105 of the current control system by the proportional control during the startup time, and the active current instruction value $I_q^*$ is given to the PI controller 105 by the time constant of the integral term. Therefore, as shown in FIG. 3, stable startup without any overshoot of the DC voltage can be performed. Moreover, since the integral term is inserted in the PI controller 105 of the current control system in a state in which the deviation between the DC voltage instruction value $V_{dc}^*$ and the DC voltage value $V_{dc}$ is small, turbulence associated with the switchover can be avoided.

Second Embodiment

Figure 4:
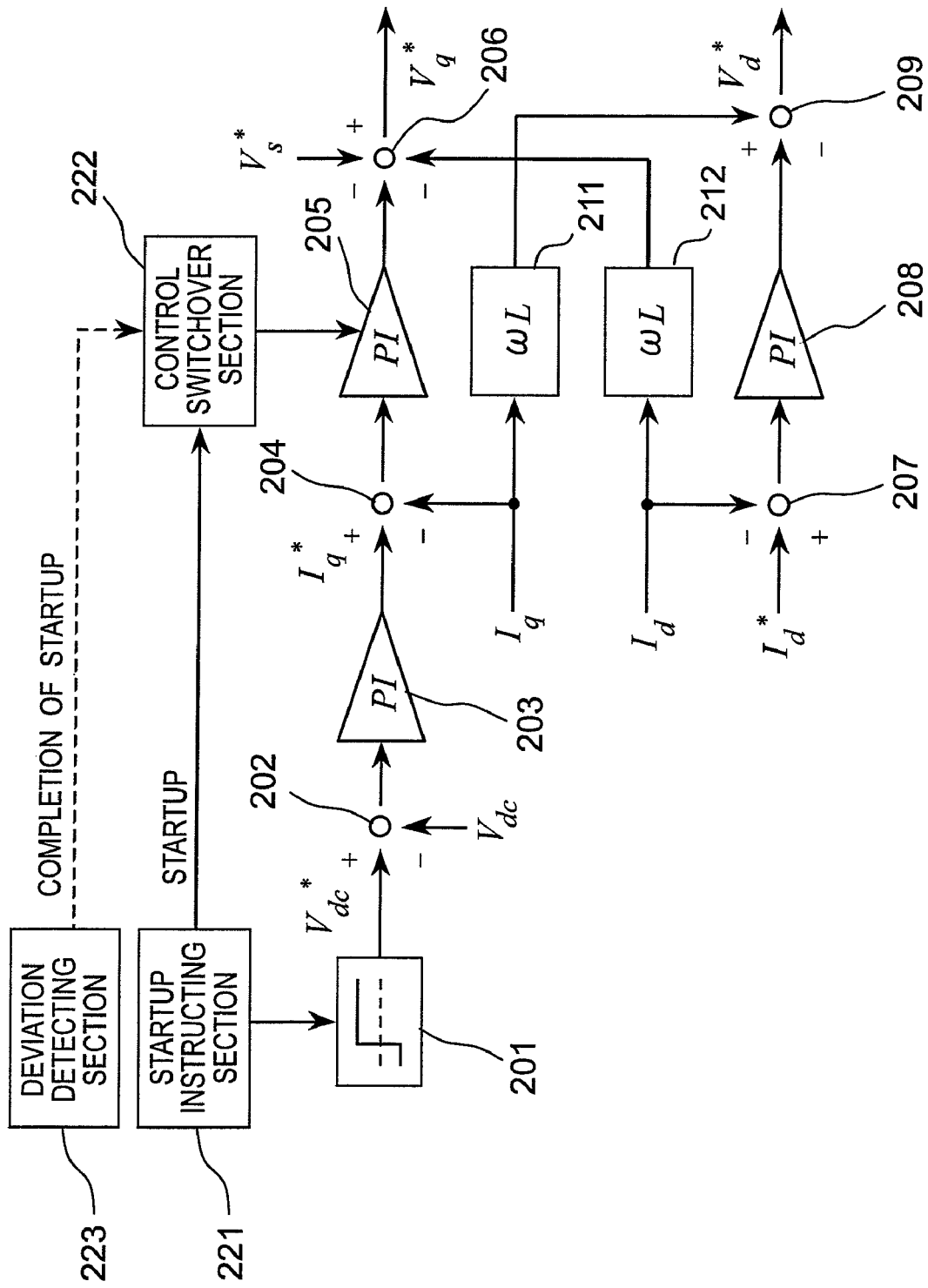
FIG. 4 is a diagram showing the construction of the essential part of the control system of the current control type converter according to a second embodiment of the invention.

FIG. 4 shows a block diagram of the essential part of the control system of a current control type converter according to the second embodiment of the invention.

As shown in FIG. 4, the current control type converter includes a DC voltage instructing section 201 that outputs a DC voltage instruction value $V_{dc}^*$, an adder-subtractor 202 that subtracts a DC voltage value $V_{dc}$ from the DC voltage instruction value $V_{dc}^*$ from the DC voltage instructing section 201, a PI controller 203 that serves as one example of the voltage controller for calculating and outputting an active current instruction value $I_q^*$ by proportional-plus-integral control to perform proportional integration of a deviation between the DC voltage instruction value $V_{dc}^*$ outputted from the adder-subtractor 202 and the DC voltage value $V_{dc}$, an adder-subtractor 204 that subtracts an active current $I_q$ from the active current instruction value $I_q^*$ from the PI controller 203, a PI controller 205 that serves as one example of the active current controller for calculating and outputting an active voltage correction value by proportional-plus-integral control to perform proportional integration of a deviation between the active current instruction value $I_q^*$ from the adder-subtractor 204 and the active current $I_q$, a multiplier 212 that multiplies the reactive current $I_d$ by an impedance $\omega L$ and outputs a q-axis interference term $I_d \omega L$, an adder-subtractor 206 that subtracts the active voltage correction value of the PI controller 205 and the q-axis interference term of the multiplier 212 from a power voltage value $V_s^*$, an adder-subtractor 207 that subtracts the reactive current $I_d$ from the reactive current instruction value $I_d^*$, a PI controller 208 that serves as one example of the reactive current controller for calculating and outputting a reactive voltage correction value by proportional-plus-integral control to perform proportional integration of a deviation between the reactive current instruction value $I_d^*$ outputted from the adder-subtractor 207 and the reactive current $I_d$, a multiplier 211 that multiplies the active current $I_q$ by the impedance $\omega L$ and outputs a d-axis interference term $I_q \omega L$, and an adder-subtractor 209 that subtracts the reactive voltage correction value of the PI controller 208 from the d-axis interference term from the multiplier 211. In this case, $\omega$ is the angular frequency of the three-phase voltage from the three-phase voltage power source 501 (shown in FIG. 1), and L is the inductance of the reactor 502 (shown in FIG. 1).

The PI controller 203 corresponds to the voltage controller 602 of FIG. 1, the PI controller 205 corresponds to the voltage controller 604 of FIG. 1, and the PI controller 208 corresponds to the voltage controller 608 of FIG. 1. Moreover, the multipliers 211, 212 correspond to the noninterference term section 605 of FIG. 1.

The current control type converter further includes a startup instructing section 221 that outputs a startup signal, a control switchover section 222 that operates the PI controller 205 by proportional control excluding the integral term of the PI controller 205 on the basis of the startup signal from the startup instruction section 221, and a deviation detecting section 223 that serves as one example of the startup completion signal outputting section for detecting a deviation between the DC voltage instruction value $V_{dc}^*$ and the DC voltage value $V_{dc}$ and outputting a startup completion signal when the absolute value of the deviation becomes smaller than a predetermined value.

In the current control type converter of the above construction, the DC voltage instructing section 201 switches the DC voltage instruction value $V_{dc}^*$ from a negative initial value to a positive predetermined value when the startup signal is outputted from the startup instructing section 221. At the same time, the control switchover section 222 switches the operation of the PI controller 205 of the current control system from the PI control to the proportional control when the startup signal is outputted from the startup instructing section 221.

Subsequently, when the startup completion signal is outputted from the deviation detecting section 223, the control switchover section 222 switches the operation of the PI controller 205 of the current control system from the proportional control to the PI control.

Figure 5:
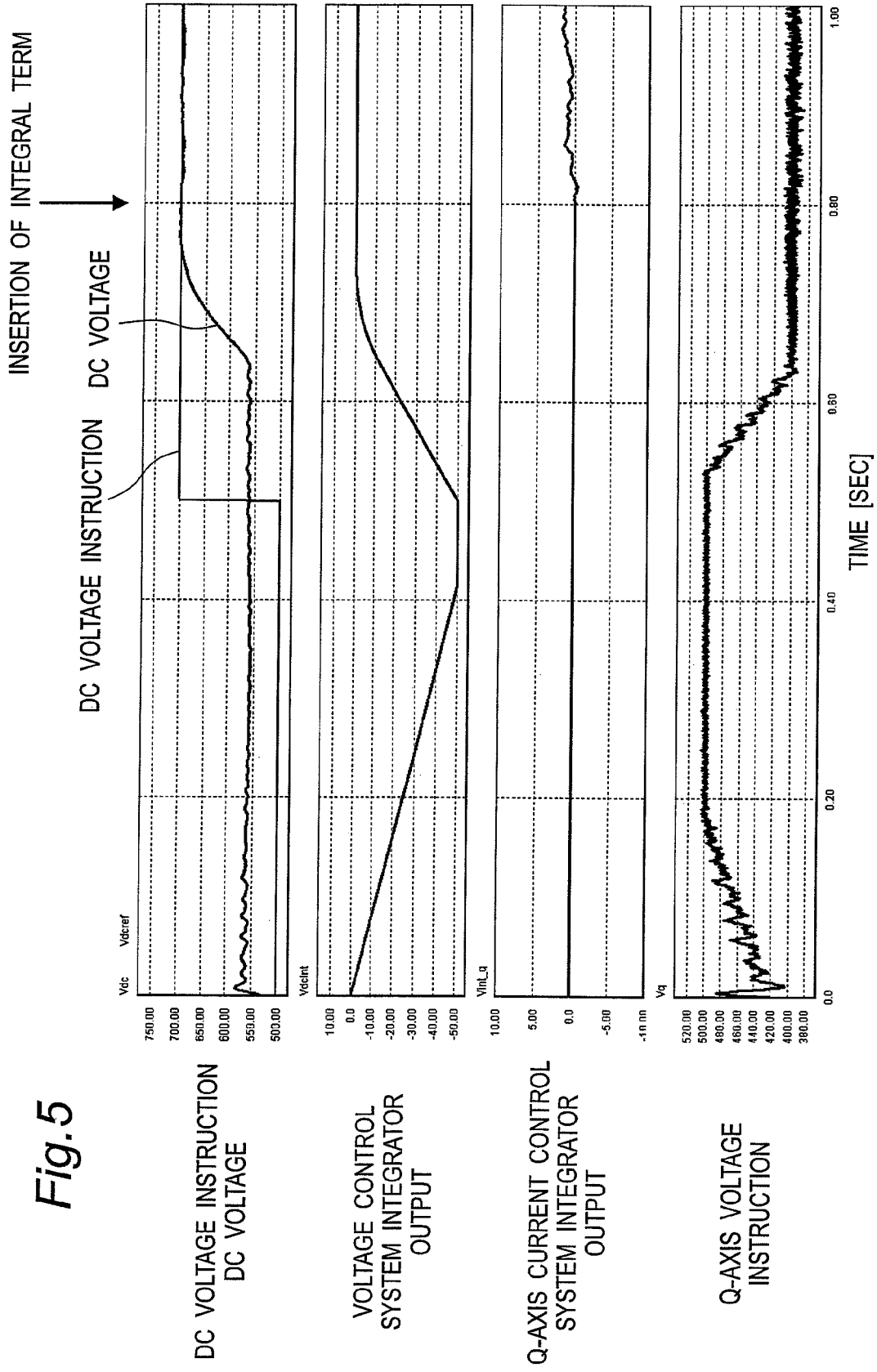
FIG. 5 is a graph showing the simulation results of the current control type converter.

FIG. 5 shows the simulation results of the current control type converter that has the control system shown in FIG. 4. It is noted that the simulation conditions are the same as the simulation conditions of the current control type converter of the first embodiment. In FIG. 5, the horizontal axis represents time [sec], and the vertical axis represents a DC voltage instruction [V], a DC voltage [V], a voltage control system integrator output, a q-axis current control system integrator output and a q-axis voltage instruction [V] from the upper side.

In the current control type converter of the second embodiment, the integral term is excluded by controlling the PI controller 105 of the current control system by the proportional control during the startup time, and startup control can be performed by the voltage instruction value with the voltage deviation made to be negative by the DC voltage instruction value. Thereby, stable startup without any overshoot of the DC voltage can be performed as shown in FIG. 5. Moreover, since the integral term is inserted in the PI controller 105 of the current control system in a state in which the deviation between the DC voltage instruction value $V_{dc}^*$ and the DC voltage value $V_{dc}$ is small, turbulence associated with the switchover can be avoided.

Third Embodiment

Figure 6:
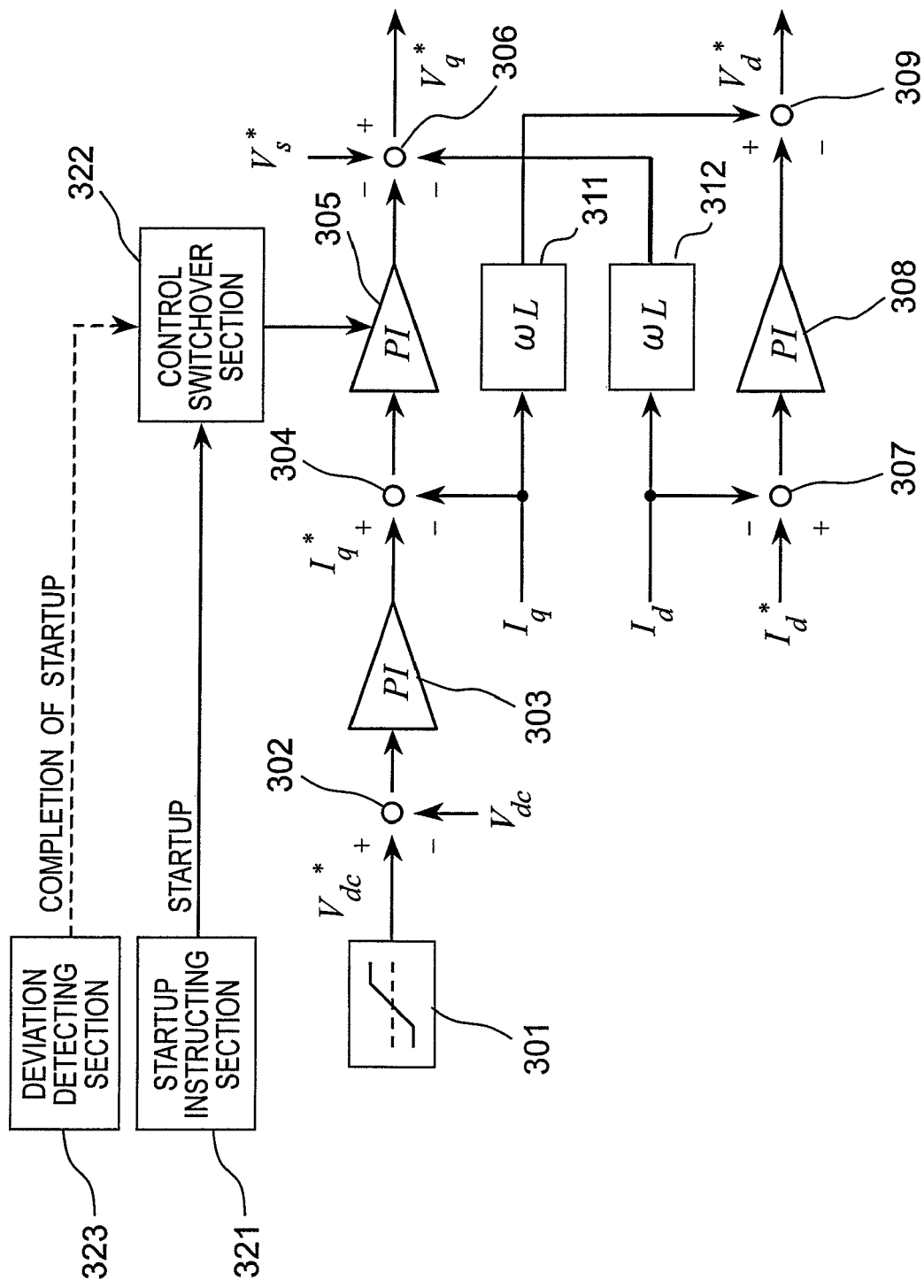
FIG. 6 is a diagram showing the construction of the essential part of the control system of the current control type converter according to a third embodiment of the invention.

FIG. 6 shows a block diagram of the essential part of the control system of a current control type converter according to the third embodiment of the invention.

As shown in FIG. 6, the current control type converter includes a DC voltage instructing section 301 that outputs a DC voltage instruction value $V_{dc}^*$, an adder-subtractor 302 that subtracts a DC voltage value $V_{dc}$ from the DC voltage instruction value $V_{dc}^*$ from the DC voltage instructing section 301, a PI controller 303 that serves as one example of the voltage controller for calculating and outputting an active current instruction value $I_q^*$ by proportional-plus-integral control to perform proportional integration of a deviation between the DC voltage instruction value $V_{dc}^*$ outputted from the adder-subtractor 302 and the DC voltage value $V_{dc}$, an adder-subtractor 304 that subtracts an active current $I_q$ from the active current instruction value $I_q^*$ from the PI controller 303, a PI controller 305 that serves as one example of the active current controller for calculating and outputting an active voltage correction value by proportional-plus-integral control to perform proportional integration of a deviation between the active current instruction value $I_q^*$ from the adder-subtractor 304 and the active current $I_q$, a multiplier 312 that multiplies the reactive current $I_d$ by an impedance ωL and outputs a q-axis interference term $I_d$ωL, an adder-subtractor 306 that subtracts the active voltage correction value of the PI controller 305 and the q-axis interference term of the multiplier 312 from a power voltage value $V_s^*$, an adder-subtractor 307 that subtracts the reactive current $I_d$ from the reactive current instruction value $I_d^*$, a PI controller 308 that serves as one example of the reactive current controller for calculating and outputting a reactive voltage correction value by proportional-plus-integral control to perform proportional integration of a deviation between the reactive current instruction value $I_d^*$ outputted from the adder-subtractor 307 and the reactive current $I_d$, a multiplier 311 that multiplies the active current $I_q$ by the impedance ωL and outputs a d-axis interference term $I_q$ωL, and an adder-subtractor 309 that subtracts the reactive voltage correction value of the PI controller 308 from the d-axis interference term from the multiplier 311. In this case, ω is the angular frequency of the three-phase voltage from the three-phase voltage power source 501 (shown in FIG. 1), and L is the inductance of the reactor 502 (shown in FIG. 1).

The PI controller 303 corresponds to the voltage controller 602 of FIG. 1, the PI controller 305 corresponds to the voltage controller 604 of FIG. 1, and the PI controller 308 corresponds to the voltage controller 608 of FIG. 1. Moreover, the multipliers 311, 312 correspond to the noninterference term section 605 of FIG. 1.

The current control type converter further includes a startup instructing section 321 that outputs a startup signal, a control switchover section 322 that operates the PI controller 305 by proportional control excluding the integral term of the PI controller 305 on the basis of the startup signal from the startup instruction section 321, and a deviation detecting section 323 that serves as one example of the startup completion signal outputting section for detecting, a deviation between the DC voltage instruction value $V_{dc}^*$ and the DC voltage value $V_{dc}$ and outputting a startup completion signal when the absolute value of the deviation becomes smaller than a predetermined value.

In the current control type converter of the above construction, the DC voltage instructing section 301 switches the DC voltage instruction value $V_{dc}^*$ from a negative initial value to a positive predetermined value in a gradually changing manner when the startup signal is outputted from the startup instructing section 321. At the same time, the control switchover section 322 switches the operation of the PI controller 305 of the current control system from the PI control to the proportional control when the startup signal is outputted from the startup instructing section 321.

When the startup completion signal is outputted from the deviation detecting section 323, the control switchover section 322 switches the operation of the PI controller 305 of the current control system from the proportional control to the PI control.

Figure 7:
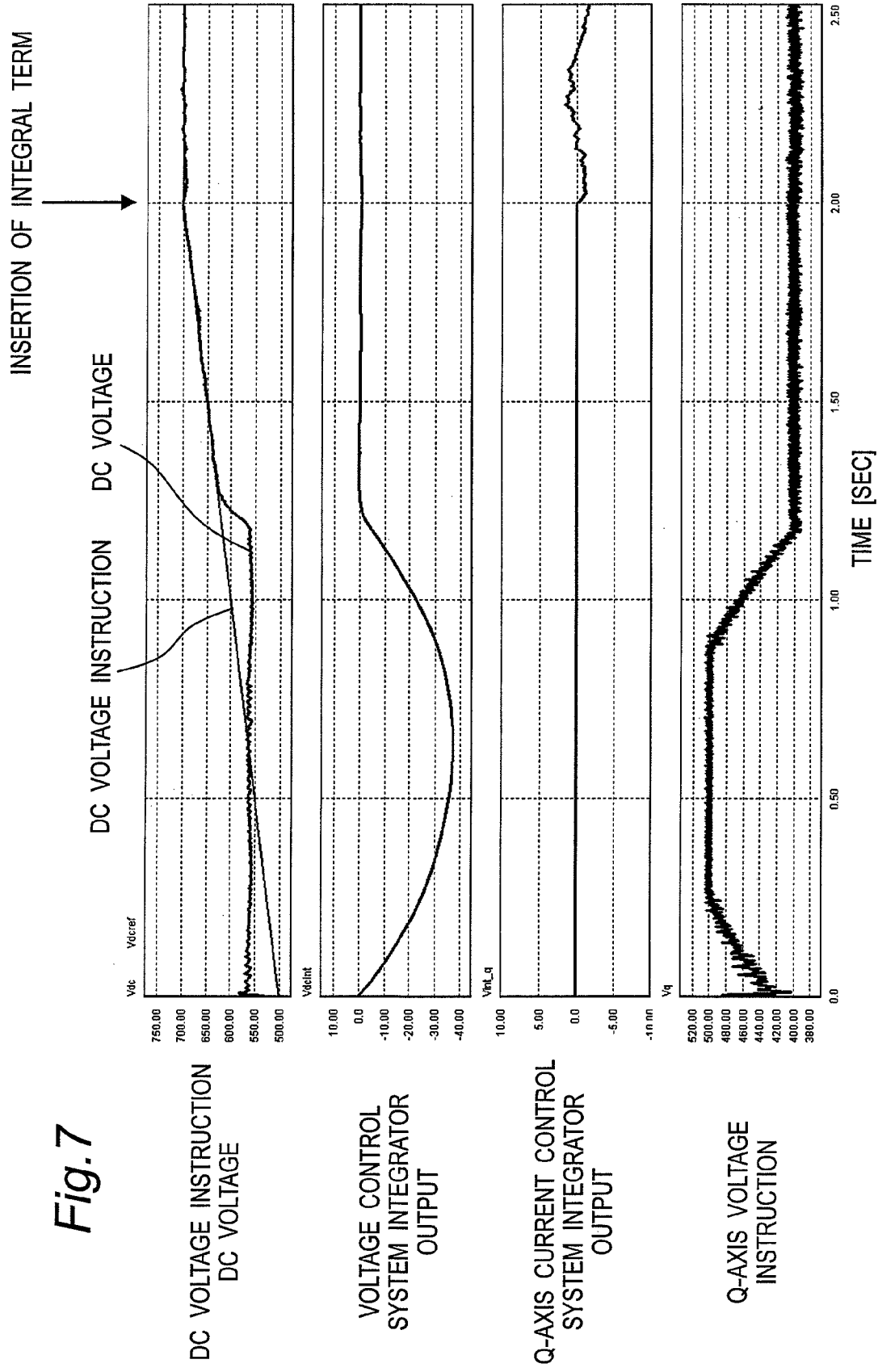
FIG. 7 is a graph showing the simulation results of the current control type converter.

FIG. 7 shows the simulation results of the current control type converter that has the control system shown in FIG. 6. It is noted that the simulation conditions are the same as the simulation conditions of the current control type converter of the first embodiment. In FIG. 7, the horizontal axis represents time [sec], and the vertical axis represents a DC voltage instruction [V], a DC voltage [V], a voltage control system integrator output, a q-axis current control system integrator output and a q-axis voltage instruction [V] from the upper side.

In the current control type converter of the third embodiment, the integral term is excluded by controlling the PI controller 105 of the current control system by the proportional control during the startup time, and the DC voltage instruction value $V_{dc}^*$ is raised by an arbitrary time constant in a period from beginning to completion of startup. Thereby stable startup without any overshoot of the DC voltage can be performed as shown in FIG. 7, and control of the voltage rise rate in correspondence with the load can be performed. Moreover, since the integral term is inserted in the PI controller 105 of the current control system in a state in which the deviation between the DC voltage instruction value $V_{dc}^*$ and the DC voltage value $V_{dc}$ is small, turbulence associated with the switchover can be avoided.

Fourth Embodiment

Figure 8:
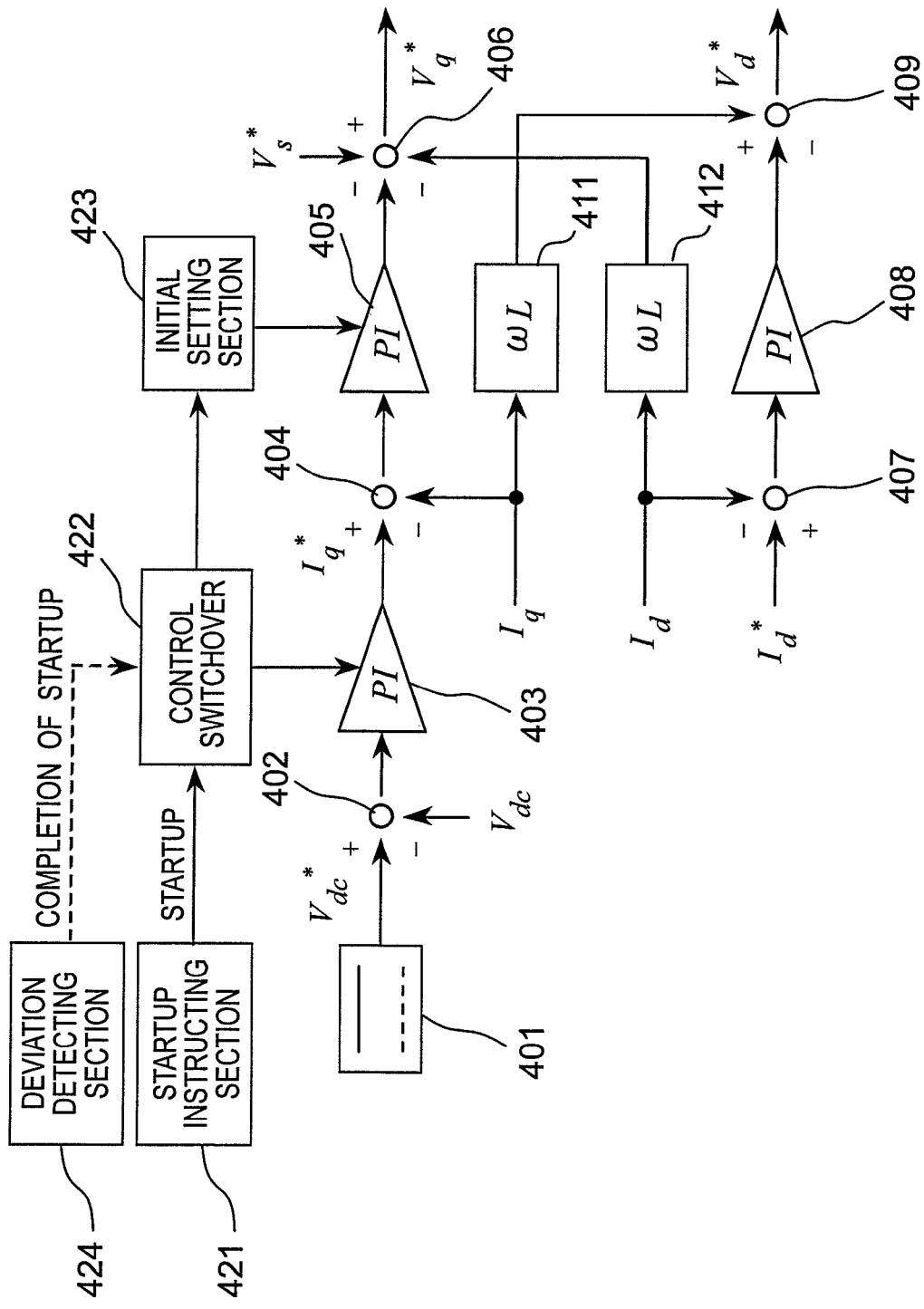
FIG. 8 is a diagram showing the construction of the essential part of the control system of the current control type converter according to a fourth embodiment of the invention.

FIG. 8 shows a block diagram of the essential part of the control system of a current control type converter according to the fourth embodiment of the invention.

As shown in FIG. 8, the current control type converter includes a DC voltage instructing section 401 that outputs a DC voltage instruction value $V_{dc}^*$, an adder-subtractor 402 that subtracts a DC voltage value $V_{dc}$ from the DC voltage instruction value $V_{dc}^*$ from the DC voltage instructing section 401, a PI controller 403 that serves as one example of the voltage controller for calculating and outputting an active current instruction value $I_q*$ by proportional-plus-integral control to perform proportional integration of a deviation between the DC voltage instruction value $V_{dc}*$ outputted from the adder-subtractor 402 and the DC voltage value $V_{dc}$, an adder-subtractor 404 that subtracts an active current $I_q$ from the active current instruction value $I_q*$ from the PI controller 403, a PI controller 405 that serves as one example of the active current controller for calculating and outputting an active voltage correction value by proportional-plus-integral control to perform proportional integration of a deviation between the active current instruction value $I_q*$ from the adder-subtractor 404 and the active current $I_q$, a multiplier 412 that multiplies the reactive current $I_d$ by an impedance $\omega L$ and outputs a q-axis interference term $I_d \omega L$, an adder-subtractor 406 that subtracts the active voltage correction value of the PI controller 405 and the q-axis interference term of the multiplier 412 from a power voltage value $V_s*$, an adder-subtractor 407 that subtracts the reactive current $I_d$ from the reactive current instruction value $I_d*$, a PI controller 408 that serves as one example of the reactive current controller for calculating and outputting a reactive voltage correction value by proportional-plus-integral control to perform proportional integration of a deviation between the reactive current instruction value $I_d*$ outputted from the adder-subtractor 407 and the reactive current $I_d$, a multiplier 411 that multiplies the active current $I_q$ by the impedance $\omega L$ and outputs a d-axis interference term $I_q \omega L$, and an adder-subtractor 409 that subtracts the reactive voltage correction value of the PI controller 408 from the d axis interference term from the multiplier 411. In this case, $\omega$ is the angular frequency of the three-phase voltage from the three-phase voltage power source 501 (shown in FIG. 1), and L is the inductance of the reactor 502 (shown in FIG. 1).

The PI controller 403 corresponds to the voltage controller 602 of FIG. 1, the PI controller 405 corresponds to the voltage controller 604 of FIG. 1, and the PI controller 408 corresponds to the voltage controller 608 of FIG. 1. Moreover, the multipliers 411, 412 correspond to the noninterference term section 605 of FIG. 1.

The current control type converter further includes a startup instructing section 421 that outputs a startup signal, a control switchover section 422 that operates the PI controller 403 by proportional control excluding the integral term of the PI controller 403 on the basis of the startup signal from the startup instructing section 421, an initial setting section 423 that sets the initial value of the PI controller 405 on the basis of the startup signal from the control switchover section 422, and a deviation detecting section 424 that serves as one example of the startup completion signal outputting section for detecting a deviation between the DC voltage instruction value $V_{dc}*$ and the DC voltage value $V_{dc}$ and outputting a startup completion signal when the absolute value of the deviation becomes smaller than a predetermined value.

In the current control type converter of the above construction, the control switchover section 422 switches the operation of the voltage controller 403 from the PI control to the proportional control when the startup signal is outputted from the startup instructing section 421, and the initial setting section 423 sets the initial value of the PI controller 405 of the current control system when the startup signal is outputted from the control switchover section 422.

Then, the control switchover section 422 switches the operation of the PI controller 405 of the current control system from the proportional control to the PI control on the basis of the startup completion signal from the deviation detecting section 424.

Figure 9:
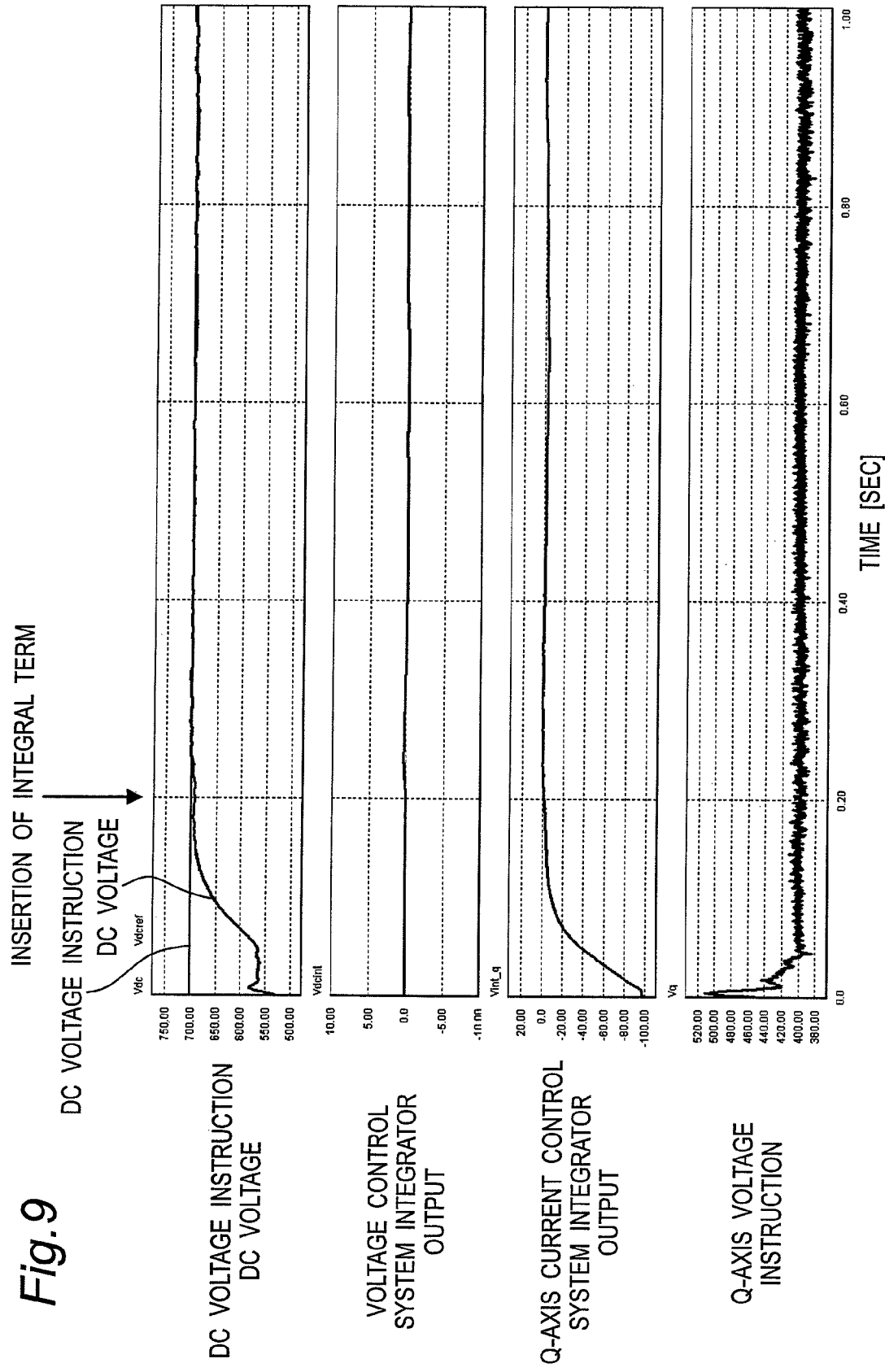
FIG. 9 is a graph showing the simulation results of the current control type converter.

FIG. 9 shows the simulation results of the current control type converter that has the control system shown in FIG. 8. The simulation conditions are the same as the simulation conditions of the current control type converter of the first embodiment. In FIG. 9, the horizontal axis represents time [sec], and the vertical axis represents a DC voltage instruction [V], a DC voltage [V], a voltage control system integrator output, a q-axis current control system integrator output and a q-axis voltage instruction [V] from the upper side.

In the current control type converter of the fourth embodiment, by performing the proportional control excluding the integral term of the PI controller 403 of the voltage control system during the startup time, stable startup without any overshoot of the DC voltage can be performed as shown in FIG. 9. Moreover, since the integral term is inserted in the PI controller 403 of the voltage control system in a state in which the deviation between the DC voltage instruction value $V_{dc}*$ and the DC voltage value $V_{dc}$ is small, turbulence associated with the switchover can be avoided.

Moreover, since both the two current control systems of the d-axis and the q-axis are of the PI control, the current control system is rendered first-order lag and stable. Control operation processing configurations of the d-axis and the q-axis can be made identical during the startup time.

Moreover, in the first through fourth embodiments, switchover to the PI control is carried out at the time point of the completion of startup, and the integral term is inserted in the state in which the deviation is small. Therefore, turbulence associated with the switching can be avoided.

Although the integral term of the PI controller of each of the first through fourth embodiments has a built-in limiter, it is assumed that the reset windup measures are taken in the compensator alone.

Moreover, although the current control type converter that employs the converter section of the pulse-width modulation system has been described in the first through fourth embodiments, the control system of the converter section is not limited to this, and the invention may be applied to a current control type converter that has a converter section of a carrier modulation system or the like.

Although the completion of startup is detected by the deviation detecting section in the first through fourth embodiments, startup may be completed after a lapse of a predetermined time from the beginning of startup by using a timer, and other means for detecting the completion of startup may be used.

What is claimed is:

1. A current control type converter comprising:
   a converter section configured to convert a three-phase AC voltage into a DC voltage; and
   a control section that controls the converter section, the control section including
      a voltage controller configured to calculate and output an active current instruction value by proportional-plus-integral control to perform proportional integration of a deviation between a value of a DC voltage outputted from the converter section and a DC voltage instruction value;
      an active current controller configured to calculate and output an active voltage correction value by proportional-plus-integral control to perform proportional integration of a deviation between the active current instruction value from the voltage controller and a value of an active current inputted to the converter section, and
      a reactive current controller configured to calculate and output a reactive voltage correction value by proportional-plus-integral control to perform proportional integration of a deviation between a reactive current instruction value and a value of a reactive current inputted to the converter section, the control section being configured to output a control signal for controlling the converter section based on the active voltage correction value from the active current controller and the reactive voltage correction value from the reactive current controller, and the control section being further configured to make the active current instruction value outputted from the voltage controller zero or negative and to operate the active current controller by proportional control in a period from a beginning to a completion of startup of the converter section, or operate the voltage controller by proportional control and make the active voltage correction value outputted from the active current controller zero or negative in the period from the beginning to the completion of startup of the converter section.

2. The current control type converter as claimed in claim 1, wherein the current control type converter is configured to make the active current instruction value outputted from the voltage controller zero or negative and to operate the active current controller by proportional control in the period from the beginning to the completion of startup of the converter section; and the control section further includes an initial setting section configured to set an initial value of the voltage controller at the beginning of startup of the converter section, a startup completion signal outputting section configured to output a startup completion signal representing the completion of startup of the converter section, and a control switchover section configured to switch operation of the active current controller from proportional-plus-integral control to proportional control at the beginning of startup of the converter section and to switch operation of the active current controller from the proportional control to the proportional-plus-integral control when the startup completion signal outputting section outputs the startup completion signal after the beginning of startup of the converter section.

3. The current control type converter as claimed in claim 1, wherein the current control type converter is configured to make the active current instruction value outputted from the voltage controller zero or negative and to operate the active current controller by proportional control in the period from the beginning to the completion of startup of the converter section; and the control section further includes a DC voltage instructing section configured to make the DC voltage instruction value a negative initial value at the beginning of startup of the converter section and to make the DC voltage instruction value a positive predetermined value a predetermined time after making the DC voltage instruction value the negative initial value, a startup completion signal outputting section configured to output a startup completion signal representing the completion of startup of the converter section, and a control switchover section configured to switch operation of the active current controller from proportional-plus-integral control to proportional control at the beginning of startup of the converter section and to switch operation of the active current controller from the proportional control to the proportional-plus-integral control when the startup completion signal outputting section outputs the startup completion signal after the beginning of startup of the converter section.

4. The current control type converter as claimed in claim 1, wherein the current control type converter is configured to make the active current instruction value outputted from the voltage controller zero or negative and to operate the active current controller by proportional control in the period from the beginning to the completion of startup of the converter section; and the control section further includes a DC voltage instructing section configured to make the DC voltage instruction value a negative initial value at the beginning of startup of the converter section and to change the initial value to a positive predetermined value in a gradually changing manner after making the DC voltage instruction value the negative initial value, a startup completion signal outputting section configured to output a startup completion, signal representing the completion of startup of the converter section, and a control switchover section configured to switch operation of the active current controller from proportional-plus-integral control to proportional control at the beginning of startup of the converter section and to switch operation of the active current controller from the proportional control to the proportional-plus-integral control when the startup completion signal outputting section outputs the startup completion signal after the beginning of startup of the converter section.

5. The current control type converter as claimed in claim 1, wherein the current control type converter configured to operate the voltage controller by proportional control and to make the active voltage correction value outputted from the active current controller zero or negative in the period from the beginning to the completion of startup of the converter section; and the control section further includes an initial setting section configured to set an initial value of the active current controller at the beginning of startup of the converter section, a startup completion signal outputting section configured to output a startup completion signal representing the completion of startup of the converter section, and a control switchover section configured to switch operation of the voltage controller from proportional-plus-integral control to proportional control at the beginning of startup of the converter section and to switch operation of the voltage controller from the proportional control to the proportional-plus-integral control when the startup completion signal outputting section outputs the startup completion signal after the beginning of startup of the converter section.

6. The current control type converter as claimed in claim 2, wherein the startup completion signal outputting section of the control section is configured to output the startup completion signal based on a deviation between the value of the DC voltage outputted from the converter section and the DC voltage instruction value.

7. The current control type converter as claimed in claim 2, wherein
the startup completion signal outputting section of the control section is configured to output the startup completion signal a predetermined startup time after the beginning of startup of the converter section.

8. The current control type converter as claimed in claim 3, wherein
the startup completion signal outputting section of the control section is configured to output the startup completion signal based on a deviation between the value of the DC voltage outputted from the converter section and the DC voltage instruction value.

9. The current control type converter as claimed in claim 3, wherein
the startup completion signal outputting section of the control section is configured to output the startup completion signal a predetermined startup time after the beginning of startup of the converter section.

10. The current control type converter as claimed in claim 4, wherein
the startup completion signal outputting section of the control section is configured to output the startup completion signal based on a deviation between the value of the DC voltage outputted from the converter section and the DC voltage instruction value.

11. The current control type converter as claimed in claim 4, wherein
the startup completion signal outputting section of the control section is configured to output the startup completion signal a predetermined startup time after the beginning of startup of the converter section.

12. The current control type converter as claimed in claim 5, wherein
the startup completion signal outputting section of the control section is configured to output the startup completion signal based on a deviation between the value of the DC voltage outputted from the converter section and the DC voltage instruction value.

13. The current control type converter as claimed in claim 5, wherein
the startup completion signal outputting section of the control section is configured to output the startup completion signal a predetermined startup time after the beginning of startup of the converter section.

* * * * *